United States Patent
Luo et al.

(10) Patent No.: US 10,728,005 B2
(45) Date of Patent: Jul. 28, 2020

(54) REDUCING PROCESSING TIME FOR LOW LATENCY TRANSMISSION AND RECEPTION

(71) Applicant: QUALCOMM Incorporated, San Diego, CA (US)

(72) Inventors: Tao Luo, San Diego, CA (US); Taesang Yoo, Riverside, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 38 days.

(21) Appl. No.: 14/931,196

(22) Filed: Nov. 3, 2015

(65) Prior Publication Data
US 2016/0134405 A1 May 12, 2016

Related U.S. Application Data

(60) Provisional application No. 62/076,390, filed on Nov. 6, 2014.

(51) Int. Cl.
*H04L 5/00* (2006.01)
*H04L 1/18* (2006.01)
*H04L 1/00* (2006.01)

(52) U.S. Cl.
CPC ............ *H04L 5/0055* (2013.01); *H04L 1/007* (2013.01); *H04L 1/0078* (2013.01); *H04L 1/1887* (2013.01); *H04L 1/0009* (2013.01)

(58) Field of Classification Search
CPC ..... H04L 1/007; H04L 1/0002; H04L 1/0067; H04L 1/0078; H04L 1/0083;
(Continued)

(56) References Cited

U.S. PATENT DOCUMENTS 8,050,179 B2 * 11/2011 Shvodian .............. H04L 1/1607
370/236
8,660,144 B2 2/2014 Cordeiro et al.
(Continued)

FOREIGN PATENT DOCUMENTS

CN 102332968 A 1/2012
JP 2003529978 A 10/2003
(Continued)

OTHER PUBLICATIONS

Braga et al., "Packet Scheduling for Voice over IP over HSDPA in Mixed Traffic Scenarios with Different End-to-End Delay Budgets," 2006 International Telecommunications Symposium, Fortaleza, Ceara, Sep. 3-6, 2006, pp. 83-88, XP_31203992A, Institute of Electrical and Electronics Engineers.
(Continued)

*Primary Examiner* — Peter Chen
(74) *Attorney, Agent, or Firm* — Holland & Hart LLP

(57) ABSTRACT

Techniques are provided for reduction of processing requirements for portions of a received transmission relative to processing requirements for other portions of the same transmission. Different coding schemes may be employed for portions of a data transmission. In some examples, a tail portion of a data transmission may use a coding scheme that had reduced processing requirements relative to other portions of the data transmission. The reduced processing requirements may allow a receiver to generate an acknowledgment of receipt relatively quickly, which may reduce latency for acknowledging receipt of a transmission.

94 Claims, 17 Drawing Sheets

(58) Field of Classification Search
CPC ... H04L 1/0003; H04L 1/0007; H04L 1/0009; H04L 1/1854; H04L 1/0041; H04L 1/0059; H04L 1/0061; H04L 1/1887; H04L 1/1812; H04L 1/1822; H04L 1/1825; H04L 5/0055
See application file for complete search history.

(56) References Cited

U.S. PATENT DOCUMENTS

| | | | |
|---|---|---|---|
| 8,693,558 | B2 | 4/2014 | Yonge, III |
| 9,166,661 | B2* | 10/2015 | Ko .................. H04L 5/0053 |
| 2001/0038630 | A1 | 11/2001 | Tong et al. |
| 2004/0174856 | A1* | 9/2004 | Brouet .................. H03M 13/35 370/349 |
| 2005/0243718 | A1* | 11/2005 | Coupechoux ......... H04W 99/00 370/229 |
| 2005/0249244 | A1* | 11/2005 | McNamara ........... H04L 1/0025 370/474 |
| 2007/0183529 | A1* | 8/2007 | Tujkovic .............. H04B 7/0413 375/267 |
| 2008/0086672 | A1* | 4/2008 | Ovchinnikov ...... H03M 13/356 714/755 |
| 2009/0073922 | A1* | 3/2009 | Malladi ................ H04L 1/0004 370/328 |
| 2009/0313516 | A1* | 12/2009 | Shin ...................... H04L 1/0003 714/748 |
| 2011/0158169 | A1* | 6/2011 | Cha ...................... H04L 1/1671 370/328 |
| 2011/0182215 | A1* | 7/2011 | Gorokhov ............ H04L 1/1829 370/280 |
| 2014/0126551 | A1* | 5/2014 | Nammi .................. H04L 1/0025 370/336 |
| 2015/0043526 | A1* | 2/2015 | Wang .................... H04L 1/0003 370/330 |
| 2015/0045016 | A1* | 2/2015 | Xiong .................. H04W 8/005 455/426.1 |

FOREIGN PATENT DOCUMENTS

| | | |
|---|---|---|
| JP | 2007043550 A | 2/2007 |
| WO | WO-2010073670 A1 | 7/2010 |
| WO | WO-2011130308 A1 | 10/2011 |

OTHER PUBLICATIONS

ISA/EPO, Partial International Search Report of the International Searching Authority, Int'l. App. No. PCT/US2015/058979, dated Feb. 2, 2016, European Patent Office, Rijswijk, NL, 13 pgs.

ISA/EPO, International Search Report and Written Opinion of the International Searching Authority, Int'l App. No. PCT/US2015/058979, dated Apr. 7, 2016, European Patent Office, Rijswijk, NL, 22 pgs.

Panasonic, "Restrict the Maximum TBS Receivable in a TTI," 3GPP TSG RAN WG1 Meeting #70, R1-123292, Qingdao, China, Aug. 13-17, 2012, 2 pgs., XP_50661182A, 3rd Generation Partnership Project.

* cited by examiner

REDUCING PROCESSING TIME FOR LOW LATENCY TRANSMISSION AND RECEPTION

CROSS REFERENCES

The present Application for Patent claims priority to U.S. Provisional Patent Application No. 62/076,390 by Luo et al., entitled "Method of Reducing Processing Time for Low Latency Transmission and Reception," filed Nov. 6, 2014.

BACKGROUND

The present disclosure, for example, relates to wireless communication systems, and more particularly to reduction of processing requirements for portions of a received transmission relative to processing requirements for other portions of the same transmission.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

In some instances, transmission errors between mobile devices and base stations are avoided and/or corrected by utilizing an automatic repeat request (ARQ) scheme. An ARQ scheme may be employed to detect whether a received packet is in error. For example, in an ARQ scheme, a receiver may notify a transmitter with a positive acknowledgment (ACK), when a packet is received free from errors; and the receiver may notify the transmitter with a negative acknowledgment (NACK), if an error is detected. A hybrid ARQ (HARM) scheme may be used to correct some errors and to detect and discard certain uncorrectable packets. In some scenarios, however, the overall HARQ delay may cause certain inefficiencies in wireless communications.

SUMMARY

The described features generally relate to one or more improved systems, methods, and/or devices for reduction of processing requirements for portions of a received transmission relative to processing requirements for other portions of the same transmission within a wireless communications system. In some examples, base stations and UEs within the wireless communications system may employ different coding schemes for portions of a data transmission. In some examples, a tail portion of a data transmission may use a coding scheme that had reduced processing requirements relative to other portions of the data transmission. The reduced processing requirements may allow a receiver to generate an acknowledgment of receipt relatively quickly, which may reduce latency for acknowledging receipt of a transmission or transmissions. In some examples, a tail portion of a transmission may use a reduced code rate or reduced block size relative to a remaining portion of the transmission to reduce processing requirements to generate an acknowledgment of receipt of the data relative to the processing requirements of the remaining portion of the transmission.

In some examples, one or more portions of a transmission may use a coding scheme having a higher probability of successful reception and decoding relative to other portions of the transmission. Channel estimation information computed associated with such portions of the transmission may be used on other portions of the transmission that have relatively lower probability of successful reception and decoding to increase the likelihood of successful reception and decoding of such other portions. In some examples, a head portion of a transmission may use a reduced code rate or reduced block size relative to a remaining portion of the transmission to increase the likelihood that data in the head portion will be successfully received and decoded.

According to a first set of examples of the disclosure, a method for wireless communication is described, the method including receiving a transmission of a data packet, the transmission having a first coding scheme for a first portion of the data packet, and a second coding scheme for a second portion of the data packet. The method may also include processing the first portion of the data packet and the second portion of the data packet to generate an acknowledgment message and transmitting the acknowledgment message.

According to the first set of examples, an apparatus for wireless communications is described, the apparatus including means for receiving a transmission of a data packet, the transmission having a first coding scheme for a first portion of the data packet, and a second coding scheme for a second portion of the data packet. The apparatus may also include means for processing the first portion of the data packet and the second portion of the data packet to generate an acknowledgment message and means for transmitting the acknowledgment message.

According to the first set of examples, another apparatus for wireless communication is described, the apparatus including a processor, and a memory in electronic communication with the processor and instructions stored in the memory. The instructions may be executable by the processor to cause the apparatus to receive a transmission of a data packet, the transmission having a first coding scheme for a first portion of the data packet, and a second coding scheme for a second portion of the data packet, process the first portion of the data packet and the second portion of the data packet to generate an acknowledgment message, and transmit the acknowledgment message.

According to the first set of examples, a non-transitory computer-readable medium storing code for wireless communication is described. The code may include instructions executable by a processor to receive a transmission of a data packet, the transmission having a first coding scheme for a first portion of the data packet, and a second coding scheme for a second portion of the data packet, process the first portion of the data packet and the second portion of the data packet to generate an acknowledgment message, and transmit the acknowledgment message.

In some aspects of the method, apparatuses, and/or non-transitory computer-readable medium of the first set of examples, the second coding scheme has different (e.g., reduced) processing requirements relative to the first coding scheme. The first coding scheme, in some examples, may use a first code rate for the first portion of the data packet, and the second coding scheme may use a second code rate for the second portion of the data packet that is reduced relative to the first code rate. In certain examples, the first coding scheme may use a first transport block size for the first portion of the data packet, and the second coding scheme may use a second transport block size for the second portion of the data packet that is smaller than the first transport block size.

In certain examples, the first portion of the data packet provides payload data associated with the data packet, and the second portion of the data packet provides non-payload data related information associated with the data packet. In some examples, the second portion of the data packet may have reduced requirements for one or more of blind detection, control channel processing or channel state information (CSI) computation relative to the first portion of the data packet.

In some aspects of the method, apparatuses, and/or non-transitory computer-readable medium of the first set of examples, processing the data packet may include processing the first portion of the data packet while receiving the second portion of the data packet; and processing the second portion of the data packet after receiving the second portion of the data packet, wherein the processing of the second portion of the data packet is less computationally intensive than processing of the first portion of the data packet. In some examples, the acknowledgment message may include a plurality of acknowledgments associated with the first and second portions of the data packet.

In some aspects of the method, apparatuses, and/or non-transitory computer-readable medium of the first set of examples, the first portion of the data packet is a head portion of the data packet and the second portion of the data packet is a tail portion of the data packet. In some examples, the first portion of the data packet is a tail portion of the data packet and the second portion of the data packet is a head portion of the data packet. The first coding scheme, in some examples, may use a first code rate for the first portion of the data packet, and the second coding scheme may use a second code rate for the second portion of the data packet that is increased relative to the first code rate. In some examples, the first coding scheme provides a higher likelihood of successful decoding the first portion of the data packet and provides information for determining a more accurate channel estimate that may be used to support second code rate. In certain examples, the first coding scheme uses a first transport block size for the first portion of the data packet, and the second coding scheme uses a second transport block size for the second portion of the data packet that is larger than the first transport block size.

In some aspects of the method, apparatuses, and/or non-transitory computer-readable medium of the first set of examples, the first coding scheme may use a first set of antenna ports and the second coding scheme uses a second set of antenna ports. A lower rank may be used, for example, for the first coding scheme and a higher rank may be used for the second coding scheme. In some examples, the first coding scheme uses a first subset of resource elements for the first portion of the data packet, and the second coding scheme uses different subset of resource elements for the second portion of the data packet.

In some aspects of the method, apparatuses, and/or non-transitory computer-readable medium of the first set of examples, signaling may be received to indicate the first and second coding schemes. The signaling may be received, for example, in one or more of a control channel transmission or a packet header. In some examples, the first portion of the data packet and the second portion of the data packet use different transmission schemes. In examples, a third portion of the data packet may be processed to generate the acknowledgement message. The transmission may have a third coding scheme for the third portion of the data packet, and the third coding scheme may different processing requirements relative to the first coding scheme or the second coding scheme, or both the first coding scheme and the second coding scheme.

For example, the first coding scheme may uses a first code rate, the second coding scheme may use a second code rate that is reduced relative to the first code rate, and the third coding scheme may use a third code rate that is reduced relative to the second code rate. In other examples, the first coding scheme may use a first code rate, the second coding scheme may use a second code rate that is increased relative to the first code rate, and the third coding scheme may use a third code rate that is reduced relative to the second code rate. The first portion of the data packet may be a head portion of the data packet, the second portion of the data packet may be a middle portion of the data packet, and the third portion of the data packet may be a tail portion of the data packet.

According to a second set of illustrative examples, a method for wireless communication is described. In one example, the method may include identifying data to be transmitted in a data packet to a receiver and identifying a first coding scheme and a second coding scheme for coding the data. The method may also include identifying a first portion of the data packet and a second portion of the data packet. The second portion of the data packet may be associated with a different (e.g., lower) processing requirement than the first portion of the data packet. The method may also include transmitting the data packet, and the first portion may be transmitted according to the first coding scheme and the second portion may be transmitted according to the second coding scheme.

According to the second set of examples, an apparatus for wireless communication is described. In one configuration, the apparatus may include means for identifying data to be transmitted in a data packet to a receiver and means for identifying a first coding scheme and a second coding scheme for coding the data. The apparatus may also include means for identifying a first portion of the data packet and a second portion of the data packet. The first portion of the data packet may be associated with a different processing requirement than the second portion of the data packet. The apparatus may also include means for transmitting the data packet, and the first portion of the data packet may be transmitted according to the first coding scheme and the second portion of the data packet may be transmitted according to the second coding scheme.

According to the second set of examples, another apparatus for wireless communication is described. In one configuration, the apparatus may include a processor; memory in electronic communication with the processor; and instructions stored in the memory. The instructions may be executable by the processor to cause the apparatus to identify data to be transmitted in a data packet to a receiver, identify a first coding scheme and a second coding scheme for coding the data, and identify a first portion of the data packet and a second portion of the data packet. The first portion of the data packet may be associated with a different processing requirement than the second portion of the data packet. The instructions may also be executable by the processor to cause the apparatus to transmit the data packet, and the first portion or the data packet may be transmitted according to the first coding scheme and the second portion of the data packet may be transmitted according to the second coding scheme.

According to the second set of examples, a non-transitory computer-readable medium storing computer-executable code for wireless communication is described. In one configuration, the code may be executable to identify data to be transmitted in a data packet to a receiver, identify a first coding scheme and a second coding scheme for coding the data, and identify a first portion of the data packet and a second portion of the data packet. The first portion of the data packet may be associated with a different processing requirement than the second portion of the data packet. The code may also be executable to transmit the data packet, and the first portion or the data packet may be transmitted according to the first coding scheme and the second portion of the data packet may be transmitted according to the second coding scheme.

In some aspects of the method, apparatuses, and/or non-transitory computer-readable medium of the second set of examples, the different processing requirement for the second portion of the data packet may include lower processing requirements for generating an acknowledgment of the second portion of the data packet than processing requirements for generating an acknowledgment for data in the first portion of the data packet. The first coding scheme may use, for example, a first code rate, and the second coding scheme may use a second code rate that is reduced relative to the first code rate. In some examples, the first coding scheme may use a first transport block size, and the second coding scheme may use a second transport block size is smaller than the first transport block size. In some examples, the second portion of the data packet may include non-data related information associated with the data packet, and the first portion of the data packet may include payload data associated with the data packet. In certain examples, the second portion of the data packet may have reduced requirements for one or more of blind detection, control channel processing or channel state information (CSI) computation relative to the remaining portion of the data. In some examples, an acknowledgment message may be received responsive to transmitting the data packet, and the acknowledgment message may include at least acknowledgment associated with the first portion of the data packet and at least one acknowledgment associated with the second portion of the data packet.

In some aspects of the method, apparatuses, and/or non-transitory computer-readable medium of the second set of examples, the second portion of the data packet is a tail portion of the data packet and the first portion of the data packet is a head portion of the data packet. In certain examples, the first portion of the data packet is a head portion of the data packet and the second portion of the data packet is a tail portion of the data packet. The first coding scheme may use for example, a first code rate, and the second coding scheme may use a second code rate that is increased relative to the first code rate. In certain examples, the first coding scheme uses a first transport block size, and the second coding scheme uses a second transport block size is larger than the first transport block size. In some examples, signaling may be transmitted to indicate the first and second coding schemes, such as in one or more of a control channel transmission or a packet header.

In some aspects the method, apparatuses, and/or non-transitory computer-readable medium of the second set of examples may include identifying a third coding scheme for coding the data and identifying a third portion of the data packet. The third portion of the data packet may be associated with a different processing requirement than the first portion of the data packet or the second portion of the data packet, or both the first portion of the data packet and the second portion of the data packet. The third portion of the data packet may be transmitted according to the third coding scheme. In some examples, the first coding scheme may use a first code rate, the second coding scheme may use a second code rate that is reduced relative to the first code rate, and the third coding scheme may use a third code rate that is reduced relative to the second code rate. In other examples, the first coding scheme may use a first code rate, the second coding scheme may use a second code rate that is increased relative to the first code rate, and the third coding scheme may use a third code rate that is reduced relative to the second code rate. Additionally or alternatively, the first portion of the data packet may be a head portion of the data packet, the second portion of the data packet may be a middle portion of the data packet, and the third portion of the data packet may be a tail portion of the data packet.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for reducing processing requirements for portions of a received transmission relative to processing requirements for other portions of the same transmission within a wireless communications system. The reduced processing requirements may allow for lower latency feedback, or may allow for enhanced reception and decoding of data included in the transmission. In some examples, base stations and UEs within the wireless communications system may employ different coding schemes for portions of a data transmission. In some examples, a tail portion of a data transmission may use a coding scheme that had reduced processing requirements relative to other portions of the data transmission. The reduced processing requirements may allow a receiver to generate an acknowledgment of receipt relatively quickly, which may reduce latency for acknowledging receipt of a transmission or transmissions. In some examples, a tail portion of a transmission may use a reduced code rate or reduced block size relative to a remaining portion of the transmission to reduce processing requirements to generate an acknowledgment of receipt of the data relative to the processing requirements of the remaining portion of the transmission.

In some examples, one or more portions of a transmission may use a coding scheme having a higher probability of successful reception and decoding relative to other portions of the transmission. Channel estimation information computed associated with such portions of the transmission may be used on other portions of the transmission that have relatively lower probability of successful reception and decoding to increase the likelihood of successful reception and decoding of such other portions. In some examples, a head portion of a transmission may use a reduced code rate or reduced block size relative to a remaining portion of the transmission to increase the likelihood that data in the head portion will be successfully received and decoded The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
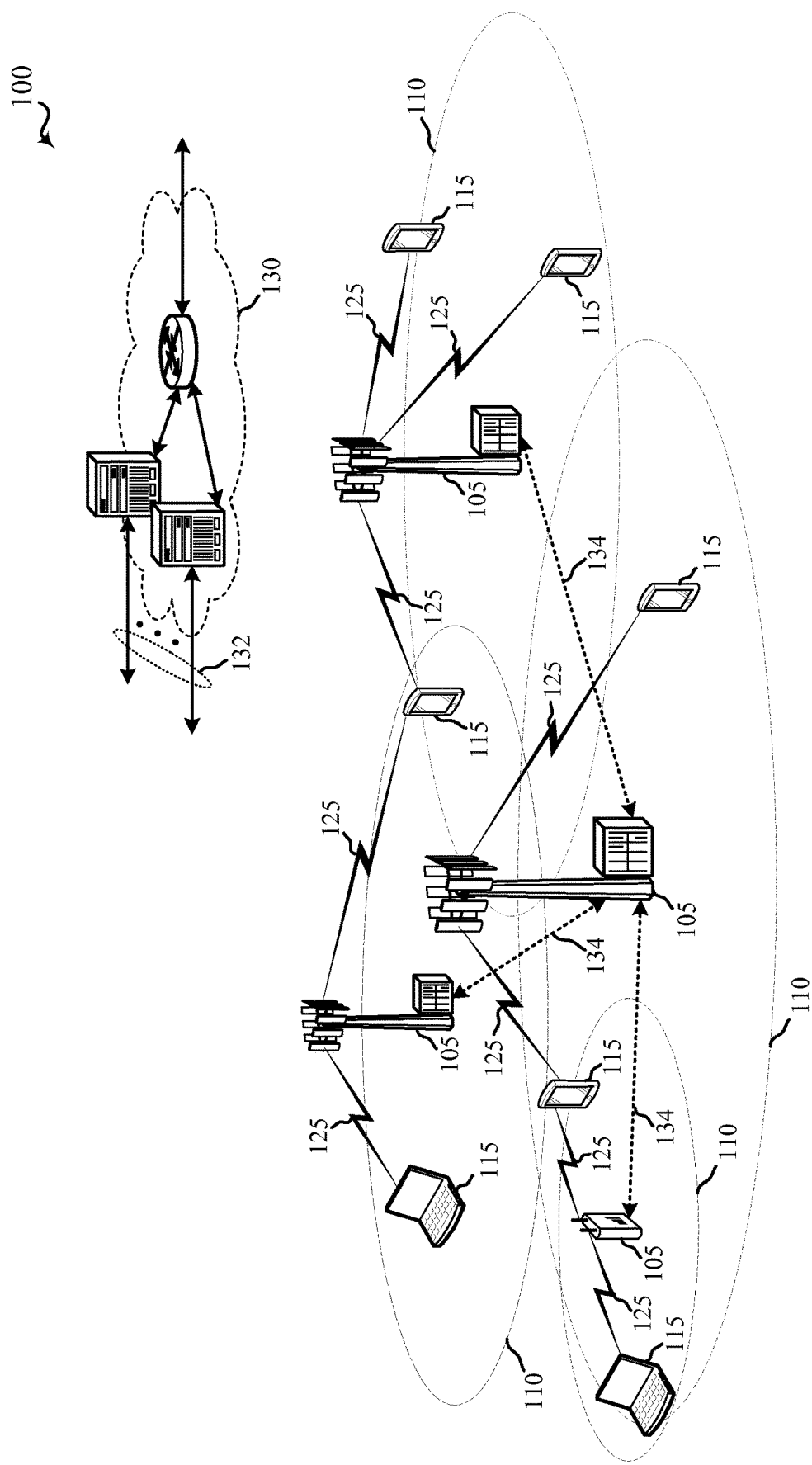
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, at least a portion of the wireless communications system 100 may be configured to operate using low latency communications, in which a symbol length of transmissions may be reduced relative to symbol lengths of legacy systems, and which may provide a reduced latency for acknowledgment of receipt of a transmission relative to latency of legacy systems. In some examples, a UE 115 may acknowledge receipt of a transmission by providing ACK/NACK for the transmission through, for example, a HARQ scheme. Acknowledgments from a UE 115 for transmissions in a legacy system or using legacy frame structures may be provided, in some examples, after a predefined number of subframes following the subframe in which the transmission was received. The UE 115, when operating in a low latency mode may, in examples, acknowledge receipt within a certain number of symbols following the symbol in which the transmission was received. The time required to transmit an ACK/NACK and receive a retransmission may be referred to as round trip time (RTT), and thus data transmitted using the legacy frame structure may have a RTT that is longer than a RTT for data transmitted using the low latency mode.

In some examples, the processing time required to generate an ACK/NACK may be further reduced by using coding schemes for portions of the transmission that have reduced processing requirements. For example, a tail portion of a transmission may use a coding scheme that has reduced processing requirements relative to a head portion of the transmission. A UE 115 may receive the head portion of the transmission and begin processing the transmission for generation of an ACK/NACK. When the tail portion of the transmission is received, the corresponding processing required for generation of the ACK/NACK may be reduced, thus allowing the ACK/NACK to be generated more quickly. Different transmission strategies and coding schemes according to various examples will be described in more detail below.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a Third Generation Partnership Project (3GPP) term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using Frequency Division Duplex (FDD) (e.g., using paired spectrum resources) or Time Division Duplex (TDD) operation (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
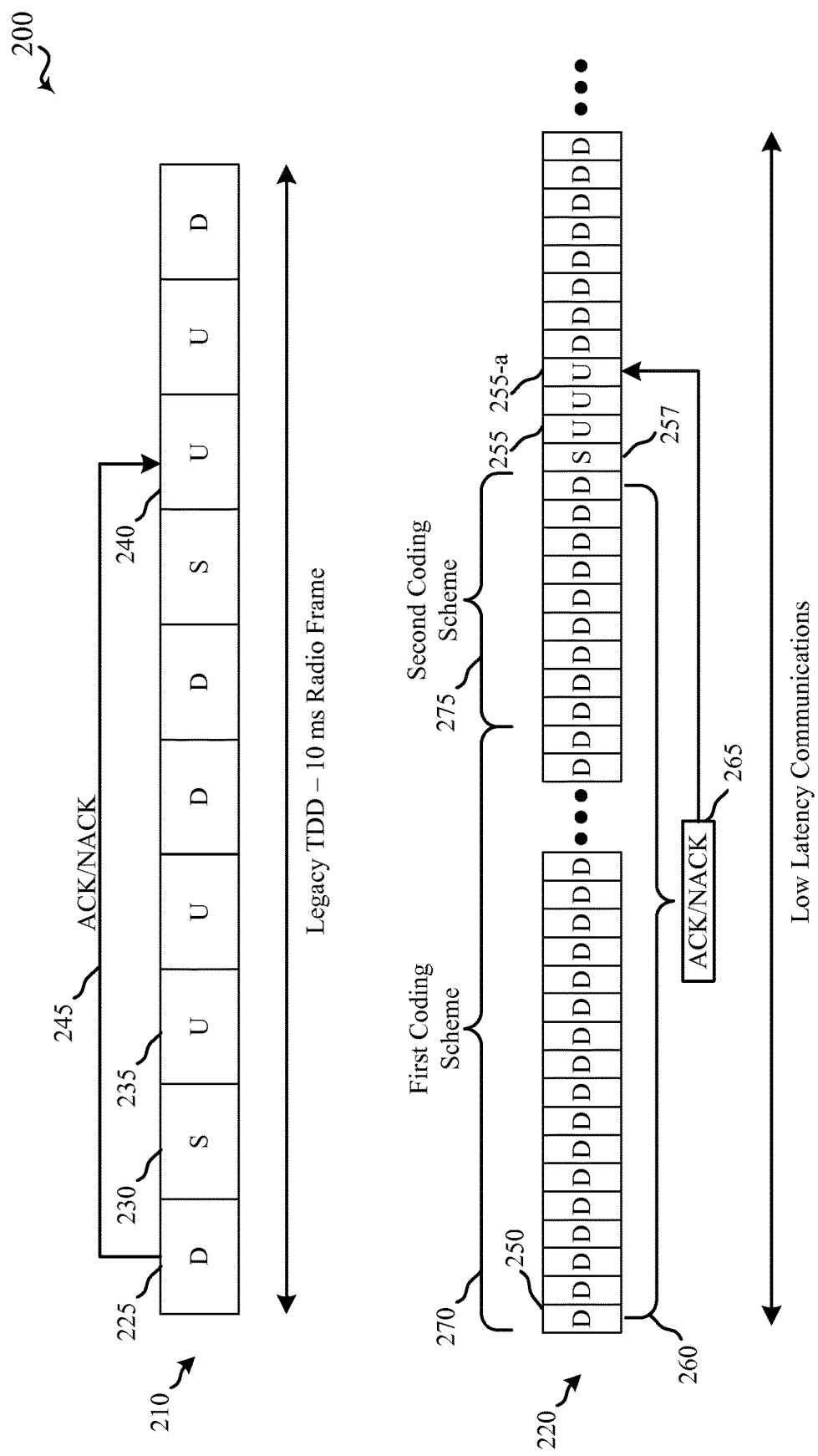
FIG. 2 is a diagram illustrating an example of legacy and low latency frame structures that may be used in a wireless communication system, in accordance with various aspects of the present disclosure.

As discussed above, various examples provide communications in a wireless communications system, such as wireless communications system 100 of FIG. 1, that utilize low latency communications having a shorter symbol duration than legacy systems. FIG. 2 is a block diagram 200 conceptually illustrating an example of radio frames and different subframes that may be transmitted using legacy or low latency modes of wireless transmissions in a wireless communication system, such as wireless communications system 100 of FIG. 1, in accordance with aspects of the present disclosure. The radio frames of FIG. 2 may be transmitted using portions of the wireless communications system 100 described with reference to FIG. 1 between one or more base stations 105, which may also be referred to as access points, and one or more UEs 115, for example. In some examples, a legacy primary cell (PCell) transmission 210 may include a TDD frame that include ten 1 ms subframes that include downlink subframes 225, special subframes 230, and uplink subframes 235. The downlink subframes 225, special subframes 230, and uplink subframes 235 may include a subframe structure defined according to established LTE standards, which may include 14 legacy symbols within each 1 ms subframe when using a normal cyclic prefix. In some examples, downlink subframes 225 may include downlink orthogonal frequency division multiplexing (OFDM) symbols, uplink subframes may include single carrier frequency division multiplexing (SC-FDM) symbols, and special subframes 230 may include both uplink SC-FDM symbols and downlink OFDM symbols.

In the example of FIG. 2, low latency transmissions 220 may include low latency or burst mode transmissions that may replace the legacy frame structure with a TDD-based frame structure that allows for dynamic switching between downlink and uplink symbols. In some examples, low latency transmissions 220 may be transmitted on a secondary cell (SCell), although it will be understood that such transmission structures, as well as various of the techniques and principles described herein, may be implemented in other transmissions, such as within one or more burst mode subframes of a legacy LTE frame, in other PCell transmissions, in licensed or unlicensed spectrum, etc. In the example of FIG. 2, the low latency transmissions 220, which may be referred to as enhanced component carrier (eCC) transmissions, may include downlink symbols 250, uplink symbols 255 and special symbols 257 that may allow for switching time between downlink symbols 250 and uplink symbols 255. Each of the symbols 250, 255, and 257 may have a reduced symbol duration relative to the legacy OFDM or SC-FDM symbols, and in some examples have a symbol duration of 11.36 µs per symbol, including a useful symbol duration of 8.33 µs and a cyclic prefix duration of 3.03 µs. In some examples, various of the symbols of the low latency transmissions 220 may be designated as uplink symbols 255 or downlink symbols 250, with remaining symbols being flexible symbols that may be allocated as uplink or downlink symbols based on particular traffic needs.

In the example of FIG. 2, a data packet may be transmitted in a data packet transmission 260 that may include a number of downlink symbols 250. An ACK/NACK 265 may be generated for the data packet transmission 260 following reception of the number of downlink symbols 250. In order to generate the ACK/NACK 265, a UE (e.g., UE 115 of FIG. 1) may process the received downlink symbols 250 to decode the data transmitted in each downlink symbol 250. In the example of FIG. 2, a first coding scheme may be used for a first portion 270 of the data packet transmission 260, and a second coding scheme may be used for a second portion 275 of the data packet transmission 260. The UE may process the first portion 270 and the second portion 275 of the data packet transmission 260 to generate the ACK/NACK 265, which may be transmitted to a base station (e.g., base station 105 of FIG. 1) in a subsequent uplink symbol 255-a in order to acknowledge successful receipt of the data packet transmission 260, or to indicate negative acknowledgment and initiate a retransmission of the data packet transmission 260. The first portion 270 and the second portion 275 of the data packet transmission 260 may be associated with different processing requirements.

As discussed above, in some examples the second coding scheme for the second portion 275 of the data packet transmission 260 may use a code rate or block size that is reduced relative to a code rate or block size used for the first portion 270 of the data packet transmission 260. The reduced code rate or block size of the second coding scheme may result in reduced processing requirements relative to the first coding scheme. In some examples, the UE may perform processing on the first portion 270 while continuing to receive subsequent symbols of the data packet transmission 260. If the first coding scheme were to be used for the entire data packet transmission 260, the processing requirements could be such that the UE may not reliably generate the ACK/NACK 265 in sufficient time for transmission in uplink symbol 255-a. With the reduced processing requirements associated with the second coding scheme, processing of the second portion 275 of the data packet transmission 260 is less computationally intensive than processing of the first portion 270 of the data packet transmission 260. Thus, the UE may process the second portion 275 of the data packet transmission 260 more quickly in order to generate the ACK/NACK 265 is sufficient time to be transmitted in the uplink symbol 255-a.

In some examples, the first portion 270 may use a first spatial scheme, and the second portion 275 may use a second spatial scheme. For example, the first portion 270 may use a diversity transmission and the second portion 275 may use a precoding transmission. In further examples, the first portion 270 and the second portion 275 may use schemes that use different sets of antenna ports. For example, the first portion 270 may use a lower rank transmission and the second portion 275 may use a higher rank transmission. Alternatively, the first portion 270 may use a higher rank transmission and the second portion 275 may use a lower rank transmission, in some examples. Additionally or alternatively, the first portion 270 may use a first subset of tones or resource elements for the first portion of the data packet, and the second portion 275 may use a different subset of tones or resource elements for the second portion of the data packet. Such a technique may enhance the robustness of reception against timing/frequency error. For example, in some examples the first portion 270 may use every other tone to transmit data in order to provide enhanced tolerance of frequency error.

As discussed above, the second coding scheme may have one or more of a reduced code rate or a reduced transport block size relative to the first coding scheme. In other examples, the second portion 275 of the data packet transmission 260 may have reduced requirements for one or more of blind detection, control channel processing or channel state information (CSI) computation relative to the first portion 270 of the data packet transmission 260. While the ACK/NACK 265 associated with the data packet transmission 260 is discussed as a single ACK/NACK, such an ACK/NACK 265 may include a plurality of acknowledgments associated with the first portion 270 and second portion 275 of the data packet transmission 260. In some examples, a base station may provide signaling to a UE that indicates the first and second coding schemes, and the number of symbols associated with each coding scheme. Such signaling may be provided, for example, in a control channel transmission, via radio resource control (RRC) signaling, in a packet header, or in downlink control information (DCI) associated with a downlink transmission, to name a few examples.

Figure 3:
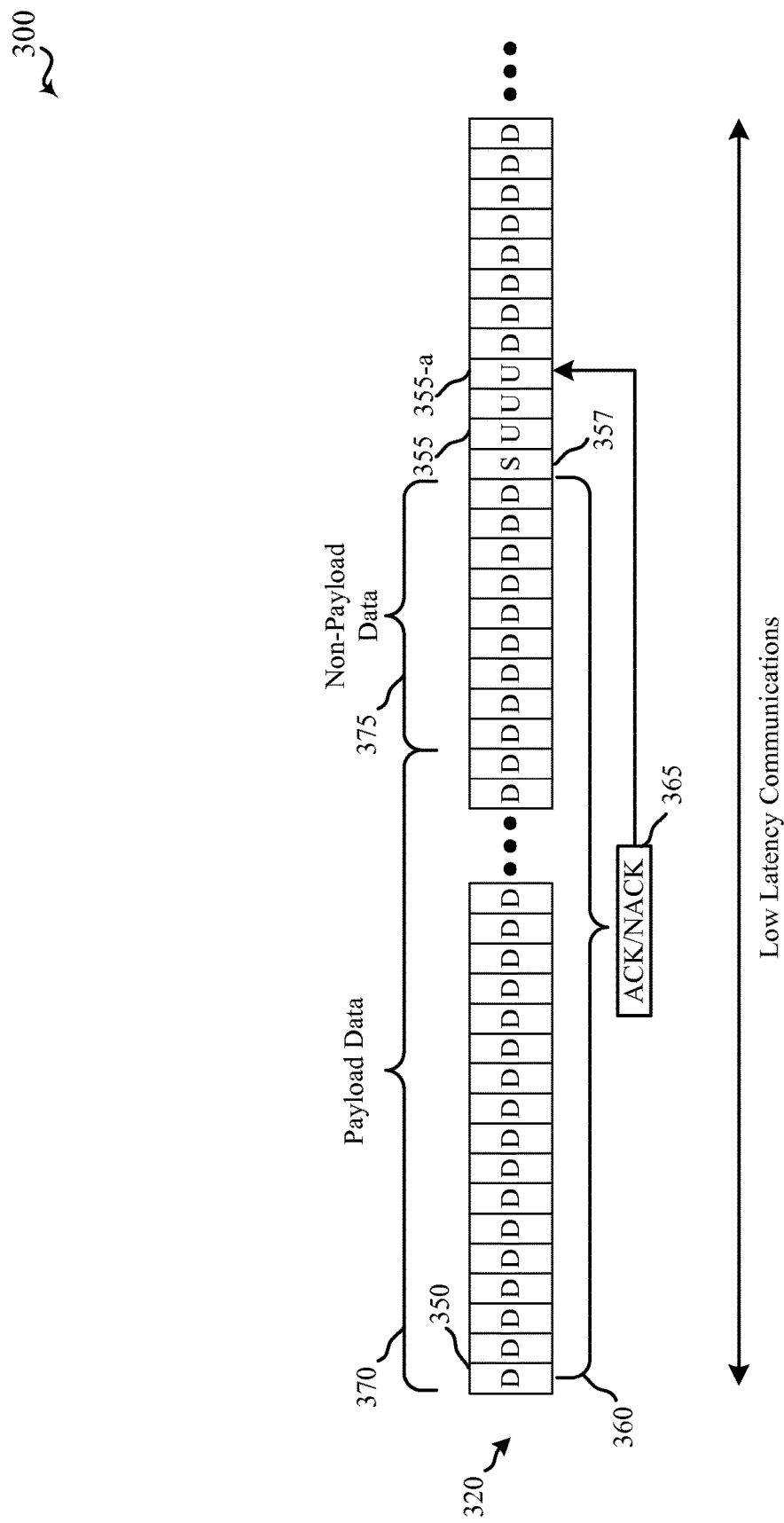
FIG. 3 is a diagram illustrating an example of different data that may be transmitted during different portions of a transmission of a wireless communication system to provide reduced latency feedback, in accordance with various aspects of the present disclosure.

With reference now to FIG. 3 a block diagram 300 conceptually illustrating an example of low latency transmissions is discussed. The low latency transmissions 320 of FIG. 3 may be transmitted using portions of the wireless communications system 100 described with reference to FIG. 1 between one or more base stations 105 and one or more UEs 115, for example. Similarly as discussed above with respect to FIG. 2, low latency transmissions 320 may include downlink symbols 350, uplink symbols 355 and special symbols 357 that may allow for switching time between downlink symbols 350 and uplink symbols 355. Each of the symbols 350, 355, and 357 may have a reduced symbol duration relative to the legacy OFDM or SC-FDM symbols, as discussed above. In the example of FIG. 3, a data packet may be transmitted in a data packet transmission 360 that may include a number of downlink symbols 350. An ACK/NACK 365 may be generated for the data packet transmission 360 following reception of the number of downlink symbols 350. In order to generate the ACK/NACK 365, a UE (e.g., UE 115 of FIG. 1) may process the received downlink symbols 350 to decode the data transmitted in each downlink symbol 350.

In the example of FIG. 3, payload data may be included in the first portion 370 of the data packet transmission 360, and non-payload data may be included in a second portion 375 of the data packet transmission 360. The UE may process the first portion 370 and the second portion 375 of the data packet transmission 360 to generate the ACK/NACK 365, which may be transmitted to a base station (e.g., base station 105 of FIG. 1) in a subsequent uplink symbol 355-a in order to acknowledge successful receipt of the data packet transmission 360, or to indicate negative acknowledgment and initiate a retransmission of the data packet transmission 360. The processing required to generate the ACK/NACK 365 with respect to the payload data, in some examples, may be more significant than the processing required for the non-payload data, and thus the ACK/NACK 365 may be generated more quickly than if payload data were included in the second portion 375, or tail portion, of the data packet transmission 360. The relative speed of the time required to generate the ACK/NACK 365 may allow transmission of the ACK/NACK 365 more quickly, and thus reduce the latency associated with the data packet transmission 360.

Figure 4:
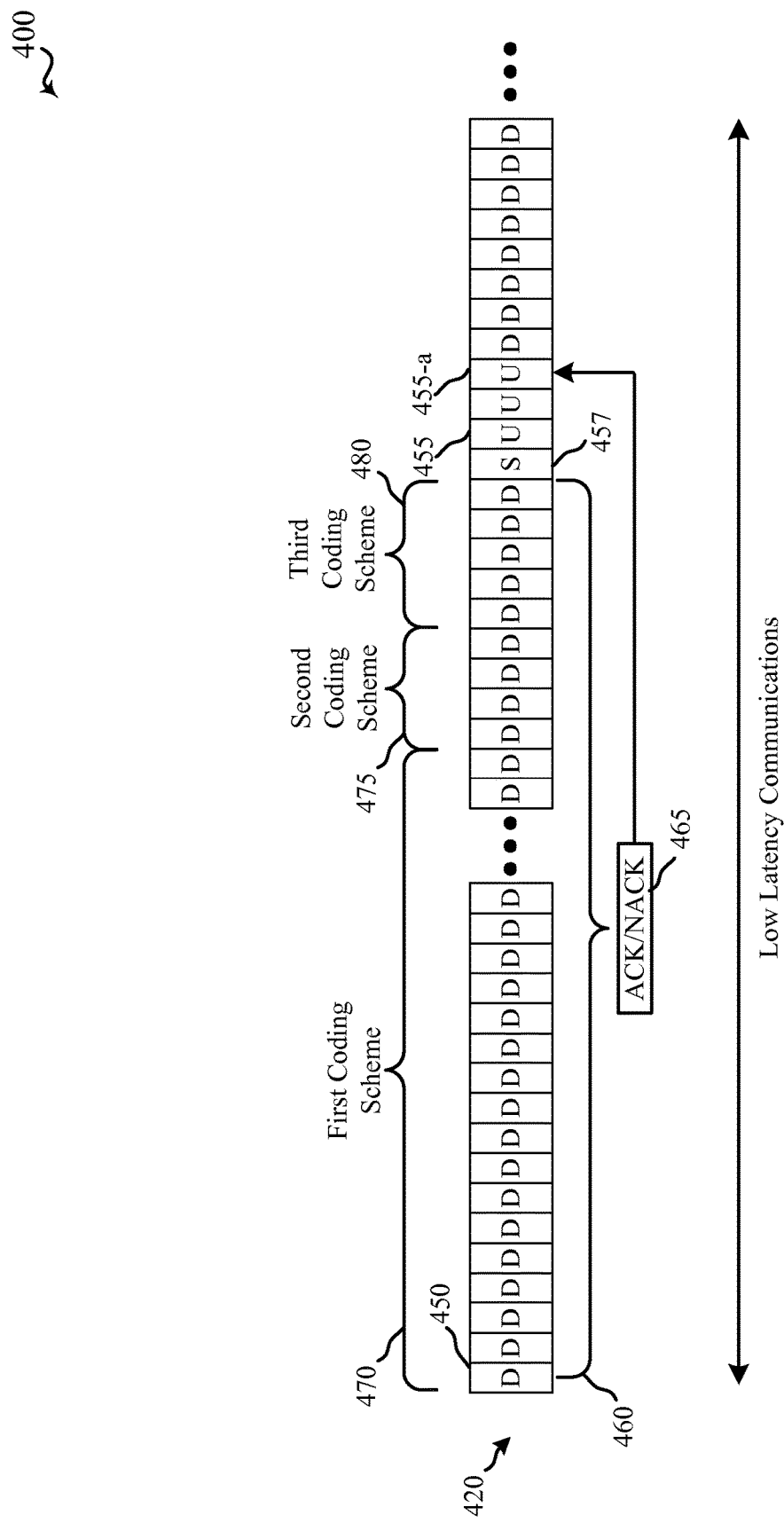
FIG. 4 is a diagram illustrating an example of different coding schemes that may be used during different portions of a transmission of a wireless communication system to provide reduced latency feedback, in accordance with various aspects of the present disclosure.

With reference now to FIG. 4 a block diagram 400 conceptually illustrating another example of low latency transmissions is discussed. The low latency transmissions 420 of FIG. 4 may be transmitted using portions of the wireless communications system 100 described with reference to FIG. 1 between one or more base stations 105 and one or more UEs 115, for example. Similarly as discussed above with respect to FIGS. 2 and 3, low latency transmissions 420 may include downlink symbols 450, uplink symbols 455, and special symbols 457 that may allow for switching time between downlink symbols 450 and uplink symbols 455. Each of the symbols 450, 455, and 457 may have a reduced symbol duration relative to the legacy OFDM or SC-FDM symbols, as discussed above. In the example of FIG. 4, a data packet may be transmitted in a data packet transmission 460 that may include a number of downlink symbols 450. An ACK/NACK 465 may be generated for the data packet transmission 460 following reception of the number of downlink symbols 450. In order to generate the ACK/NACK 465, a UE (e.g., UE 115 of FIG. 1) may process the received downlink symbols 450 to decode the data transmitted in each downlink symbol 450.

In the example of FIG. 4, a first portion 470 of the data packet transmission 460 may use a first coding scheme, a second portion 475 of the data packet transmission 460 may use a second coding scheme, and a third portion 480 of the data packet transmission 460 may use a third coding scheme. The UE may process the first portion 470, the second portion 475, and the third portion 480 of the data packet transmission 460 to generate the ACK/NACK 465, which may be transmitted to a base station (e.g., base station 105 of FIG. 1) in a subsequent uplink symbol 455-a in order to acknowledge successful receipt of the data packet transmission 460, or to indicate negative acknowledgment and initiate a retransmission of the data packet transmission 460.

In some examples the second coding scheme for the second portion 475 of the data packet transmission 460 may use a code rate or block size that is reduced relative to a code rate or block size used for the first portion 470 of the data packet transmission 460, and the third coding scheme for the third portion 480 of the data packet transmission 460 may use a code rate or block size that is further reduced relative to a code rate or block size used for the first portion 470 and the second portion 475. The reduced code rate or block size of the second and third coding schemes may result in reduced processing requirements relative to the first coding scheme and may provide a reduced time for a UE to generate the ACK/NACK 465. With the reduced processing requirements associated with the second and third coding schemes, processing of the second portion 475 and third portion 480 of the data packet transmission 460 is less computationally intensive than processing of the first portion 470 of the data packet transmission 460. Thus, the UE may process the data packet transmission 460 more quickly in order to generate the ACK/NACK 465 is sufficient time to be transmitted in the uplink symbol 455-a.

In some examples, the first and third coding schemes may provide reduced code rates or block size relative to the second coding scheme. In such examples, the reduced code rate or reduced transport block size of the first coding scheme may allow for reduced processing time and may allow for the UE to enhance channel estimation for the wireless communications channel used for the downlink communications. The enhanced channel estimation may be used to receive and decode later transmissions more efficiently during the second portion 475 and third portion 480. Finally, similarly as discussed above, the third coding scheme may allow for faster processing of the associated downlink symbols and may allow faster transmission of the ACK/NACK 465 for reduced latency.

Figure 5:
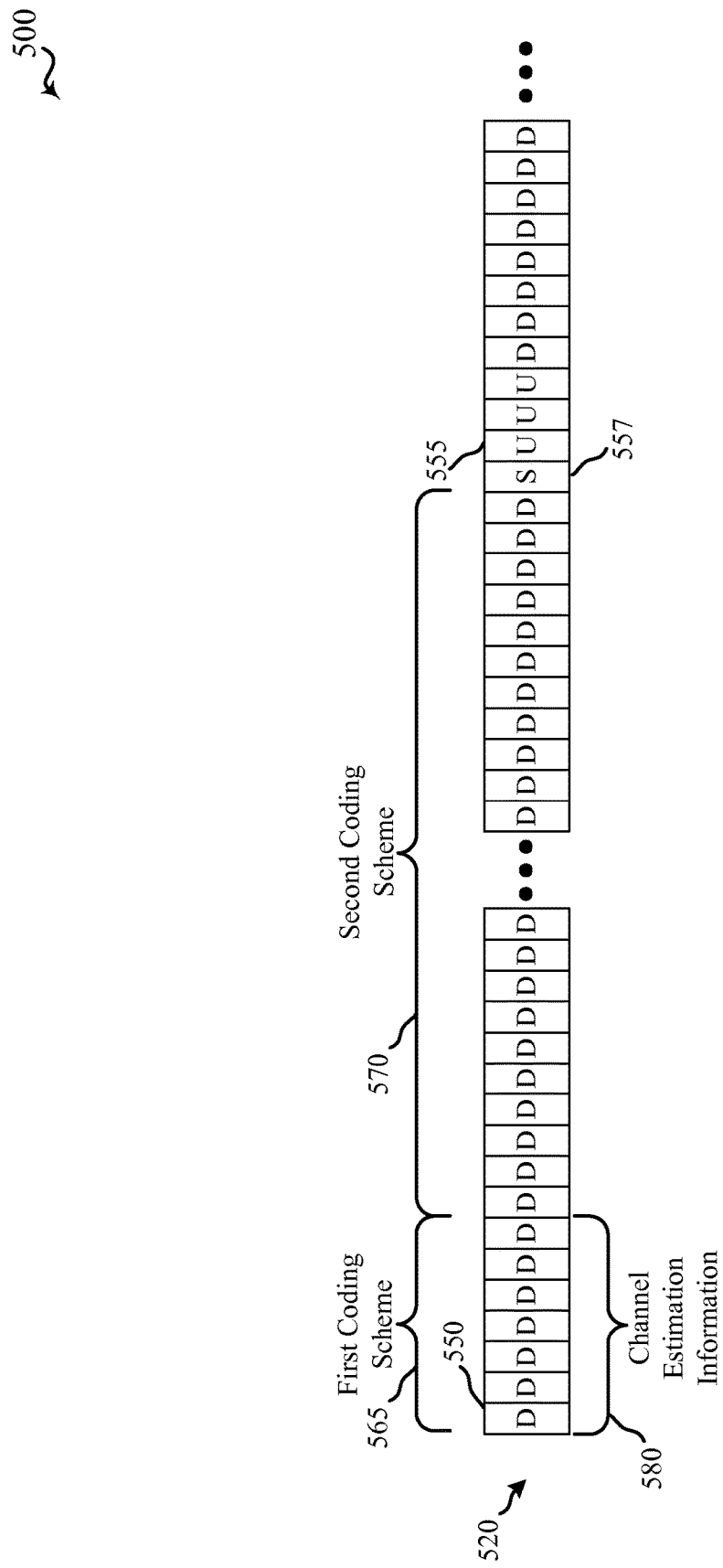
FIG. 5 is a diagram illustrating an example of different coding schemes that may be used during different portions of a transmission of a wireless communication system to provide enhanced reception and decoding for portions of the transmission, in accordance with various aspects of the present disclosure.

With reference now to FIG. 5 a block diagram 500 conceptually illustrating another example of low latency transmissions is discussed. The low latency transmissions 520 of FIG. 5 may be transmitted using portions of the wireless communications system 100 described with reference to FIG. 1 between one or more base stations 105 and one or more UEs 115, for example. Similarly as discussed above with respect to FIGS. 2, 3 and 4, low latency transmissions 520 may include downlink symbols 550, uplink symbols 555, and special symbols 557 that may allow for switching time between downlink symbols 550 and uplink symbols 555. Each of the symbols 550, 555, and 557 may have a reduced symbol duration relative to the legacy OFDM or SC-FDM symbols, as discussed above.

In the example of FIG. 5, a first portion 565 of the low latency transmissions 520 may use a first coding scheme, and a second portion 570 of the low latency transmissions 520 may use a second coding scheme. In some examples the first coding scheme for the first portion 565 may use a code rate or block size that is reduced relative to a code rate or block size used for the second portion 570. The reduced code rate or block size of the first coding scheme may provide a higher likelihood of successful decoding the first portion 565, and the first portion 565 may be used to provide enhanced channel estimation information 580, and such an enhanced channel estimation may be used to support second code rate or block size of the second portion 570.

Figure 6:
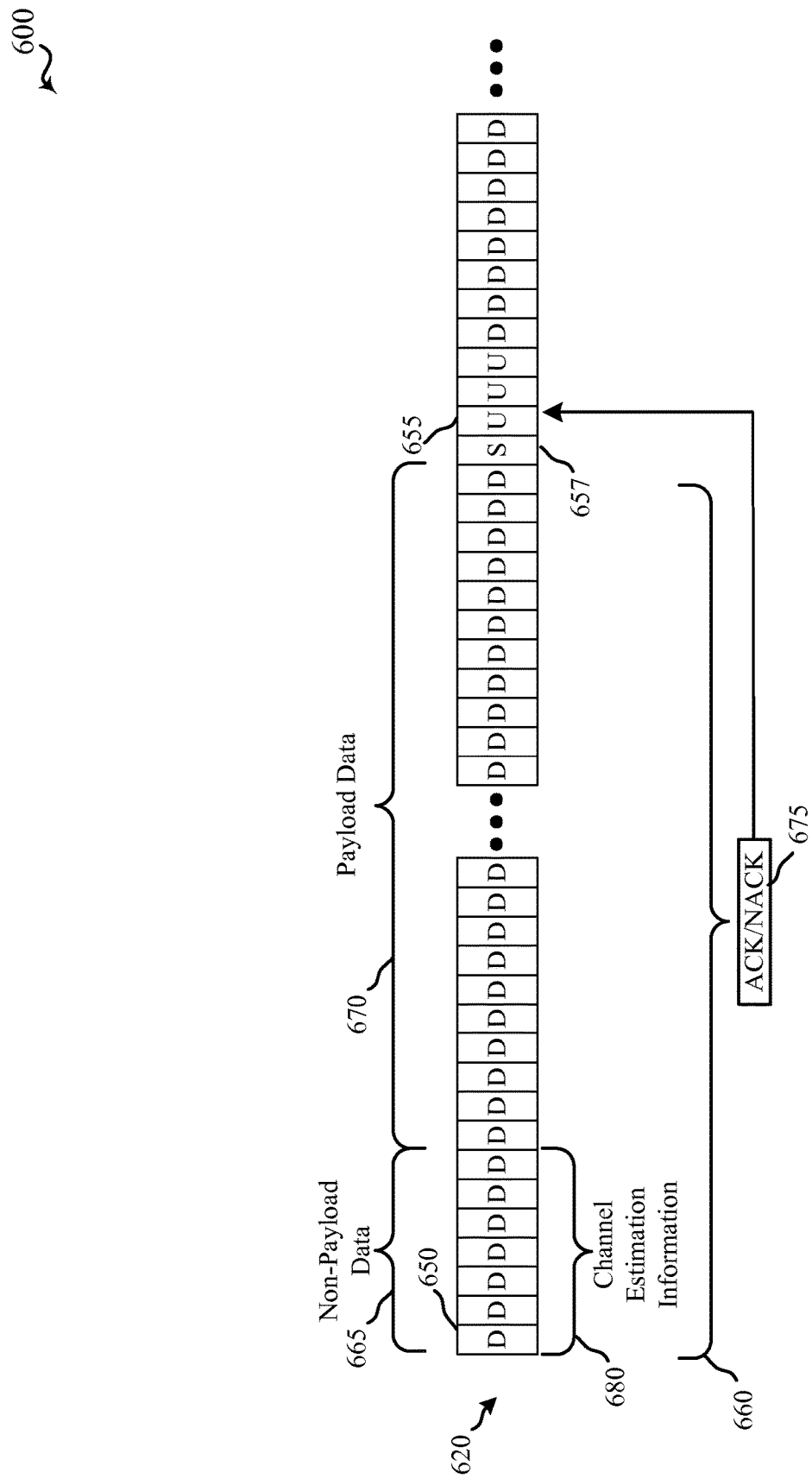
FIG. 6 is a diagram illustrating an example of different data that may be transmitted during different portions of a transmission of a wireless communication system to provide enhanced reception and decoding for portions of the transmission, in accordance with various aspects of the present disclosure.

With reference now to FIG. 6 a block diagram 600 conceptually illustrating an example of low latency transmissions is discussed. The low latency transmissions 620 of FIG. 6 may be transmitted using portions of the wireless communications system 100 described with reference to FIG. 1 between one or more base stations 105 and one or more UEs 115, for example. Similarly as discussed above with respect to FIGS. 2-5, low latency transmissions 620 may include downlink symbols 650, uplink symbols 655 and special symbols 657 that may allow for switching time between downlink symbols 650 and uplink symbols 655. Each of the symbols 650, 655, and 657 may have a reduced symbol duration relative to the legacy OFDM or SC-FDM symbols, as discussed above. In the example of FIG. 6, a data packet may be transmitted in a data packet transmission 660 that may include a number of downlink symbols 650. An ACK/NACK 675 may be generated for the data packet transmission 660 following reception of the number of downlink symbols 650. In order to generate the ACK/NACK 675, a UE (e.g., UE 115 of FIG. 1) may process the received downlink symbols 650 to decode the data transmitted in each downlink symbol 650.

In the example of FIG. 6, non-payload data may be included in the first portion 665 of the low latency transmissions 620, and payload data may be included in a second portion 670 of the low latency transmissions 620. The UE may process the first portion 665 and the second portion 670 to generate an acknowledgment of receipt of data, similarly as discussed above, which may be transmitted to a base station (e.g., base station 105 of FIG. 1) in an uplink symbol 655 in order to acknowledge successful receipt of data in the low latency transmissions 620, or to indicate negative acknowledgment and initiate a retransmission. Similarly as discussed above with respect to FIG. 5, initial downlink transmissions received by a UE may lack an accurate channel estimate, and the head portion or first portion 665 of the low latency transmission 620 may require more computationally intensive processing or take a longer time to decode.

By transmitting non-payload related information in the first portion 665, the processing requirements of this data may be reduced and may allow the UE to compute more accurate channel estimation information 680, which may in turn reduce the processing requirements and processing time for symbols received in the second portion 670. In still further examples, combinations of techniques may be used, similarly as discussed above with respect to FIG. 5, in which channel estimates may be improved during a head portion of a transmission, and in which a processing requirements may be reduced in a tail portion of a transmission, in order to enhance reception of data and generation of ACK/NACK information more quickly.

Figure 7:
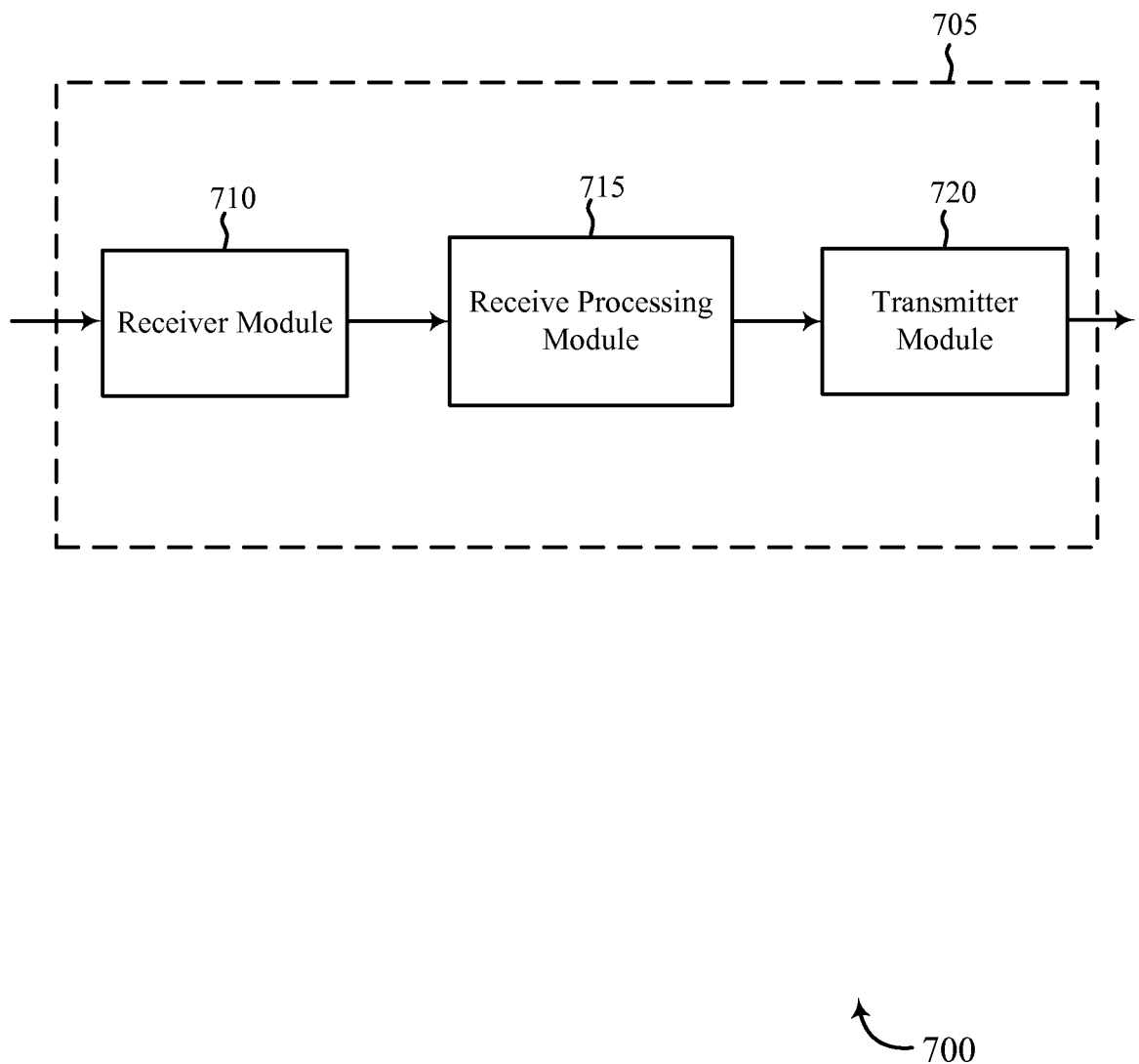
FIG. 7 shows a block diagram of a device configured for use in wireless communication, in accordance with various aspects of the present disclosure.

FIG. 7 shows a block diagram 700 of a device 705 for use in wireless communication, in accordance with various aspects of the present disclosure. The device 705 may be an example of one or more aspects of a UE 115 described with reference to FIG. 1. The device 705 may include a receiver module 710, a receive processing module 715, and/or a transmitter module 720. The device 705 may also be or include a processor (not shown). Each of these modules may be in communication with each other.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 710 may receive information such as packets, user data, and/or control information associated with various information channels (e.g., control channels, data channels, etc.). The receiver module 710 may be configured to receive control signals for preempting scheduled grants of downlink transmissions, and other signals that may indicate a whether such control signals are to be monitored or when such monitoring is to be performed. Information may be passed on to the receive processing module 715, and to other components of the device 705.

The receive processing module 715 may be configured to determine a coding scheme used for different portions of a downlink transmission, perform receiving and decoding functions on received data, and may also perform channel estimation functions, such as discussed above with respect to FIGS. 2-6. The transmitter module 720 may transmit the one or more signals received from other components of the device 705. The transmitter module 720 may transmit uplink data, for example. In some examples, the transmitter module 720 may be collocated with the receiver module 710 in a transceiver module. The receiver module 710 and the transmitter module 720 may illustrate aspects of the transceiver module 935 described with reference to FIG. 9.

Figure 8:
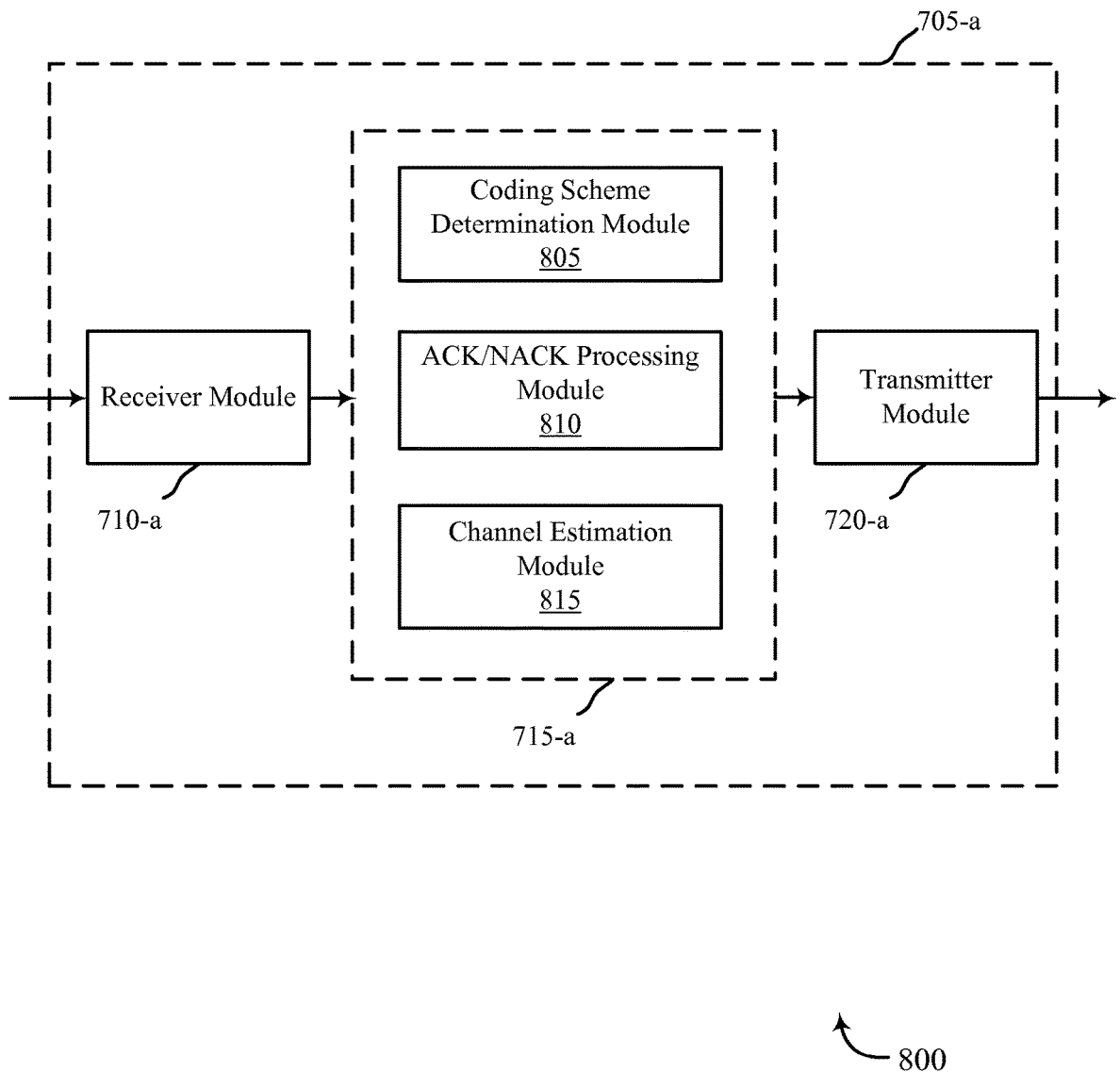
FIG. 8 shows a block diagram of a device configured for use in wireless communication, in accordance with various aspects of the present disclosure.

FIG. 8 shows a block diagram 800 of a device 705-*a* for use in wireless communication, in accordance with various examples. The device 705-*a* may be an example of one or more aspects of a UE 115 described with reference to FIG. 1. It may also be an example of a device 705 described with reference to FIG. 7. The device 705-*a* may include a receiver module 710-*a*, a receive processing module 715-*a*, and/or a transmitter module 720-*a*, which may be examples of the corresponding modules of device 705. The device 705-*a* may also include a processor (not shown). Each of these components may be in communication with each other. The receive processing module 715-*a* may include a coding scheme determination module 805, an ACK/NACK processing module 810, and a channel estimation module 815. The receiver module 710-*a* and the transmitter module 720-*a* may perform the functions of the receiver module 710 and the transmitter module 720, of FIG. 7, respectively. The receiver module 710-*a* and the transmitter module 720-*a* may illustrate aspects of the transceiver module 935 described with reference to FIG. 9.

The coding scheme determination module 805 may determine a coding scheme used for a downlink transmission, or various different portions of a downlink transmission, such as discussed above with respect to FIGS. 2-6. The ACK/NACK processing module 810 may process received symbols and generate ACK/NACK information associated with the received symbols, in a manner similar as discussed above with respect to FIGS. 2-6. The channel estimation module 815 may perform channel estimation operations that may be used to enhance the reception and decoding of received transmissions, in a manner similar as discussed above with respect to FIGS. 2-6.

Figure 9:
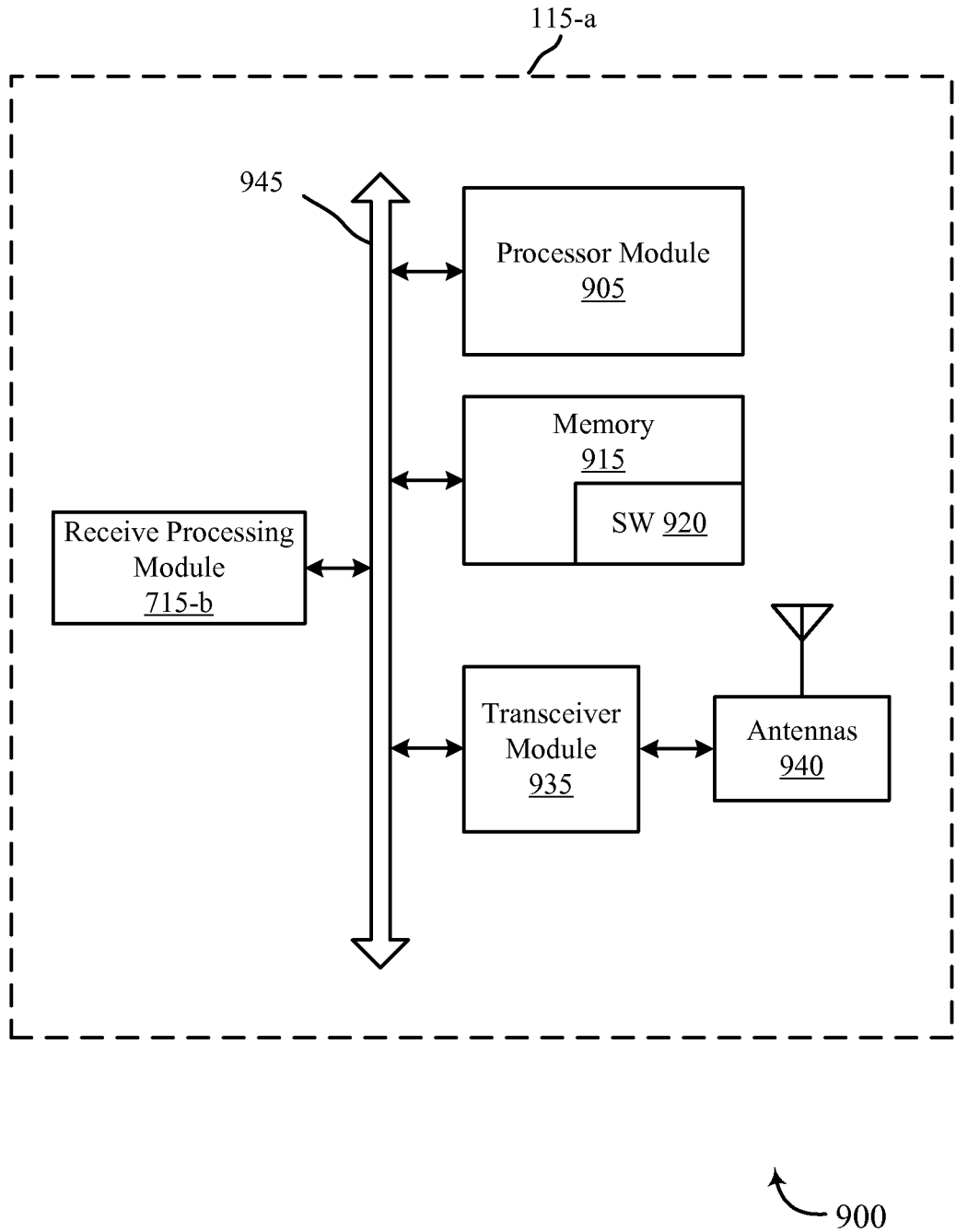
FIG. 9 shows a block diagram of a wireless communication system, in accordance with various aspects of the present disclosure.

FIG. 9 shows a system 900 for use in wireless communication, in accordance with various examples. System 900 may include a UE 115-*a*, which may be an example of the UEs 115 of FIG. 1. UE 115-*a* may also be an example of one or more aspects of devices 705 of FIGS. 7 and 8.

The UE 115-*a* may generally include components for bi-directional voice and data communications including components for transmitting communications and components for receiving communications. The UE 115-*a* may include antenna(s) 940, a transceiver module 935, a processor module 905, and memory 915 (including software (SW) 920), which each may communicate, directly or indirectly, with each other (e.g., via one or more buses 945). The transceiver module 935 may be configured to communicate bi-directionally, via the antenna(s) 940 and/or one or more wired or wireless links, with one or more networks, as described above. For example, the transceiver module 935 may be configured to communicate bi-directionally with base stations 105 with reference to FIG. 1. The transceiver module 935 may include a modem configured to modulate the packets and provide the modulated packets to the antenna(s) 940 for transmission, and to demodulate packets received from the antenna(s) 940. While the UE 115-*a* may include a single antenna 940, the UE 115-*a* may have multiple antennas 940 capable of concurrently transmitting and/or receiving multiple wireless transmissions. The transceiver module 935 may be capable of concurrently communicating with one or more base stations 105 via multiple component carriers.

The UE 115-*a* may include a receive processing module 715-*b*, which may perform the functions described above for the receive processing modules 715 of device 705 of FIGS. 7 and 8. The receive processing module 715-*b* may perform functions in a manner similar as discussed above with respect to FIGS. 2-6.

The memory 915 may include random access memory (RAM) and read-only memory (ROM). The memory 915 may store computer-readable, computer-executable software/firmware code 920 containing instructions that are configured to, when executed, cause the processor module 905 to perform various functions described herein (e.g., variable TTI scheduling, determination of preemption of a grant, etc.). Alternatively, the computer-readable, computer-executable software/firmware code 920 may not be directly executable by the processor module 905 but be configured to cause a computer (e.g., when compiled and executed) to perform functions described herein. The processor module 905 may include an intelligent hardware device, e.g., a central processing unit (CPU), a microcontroller, an application-specific integrated circuit (ASIC), etc.

Figure 10:
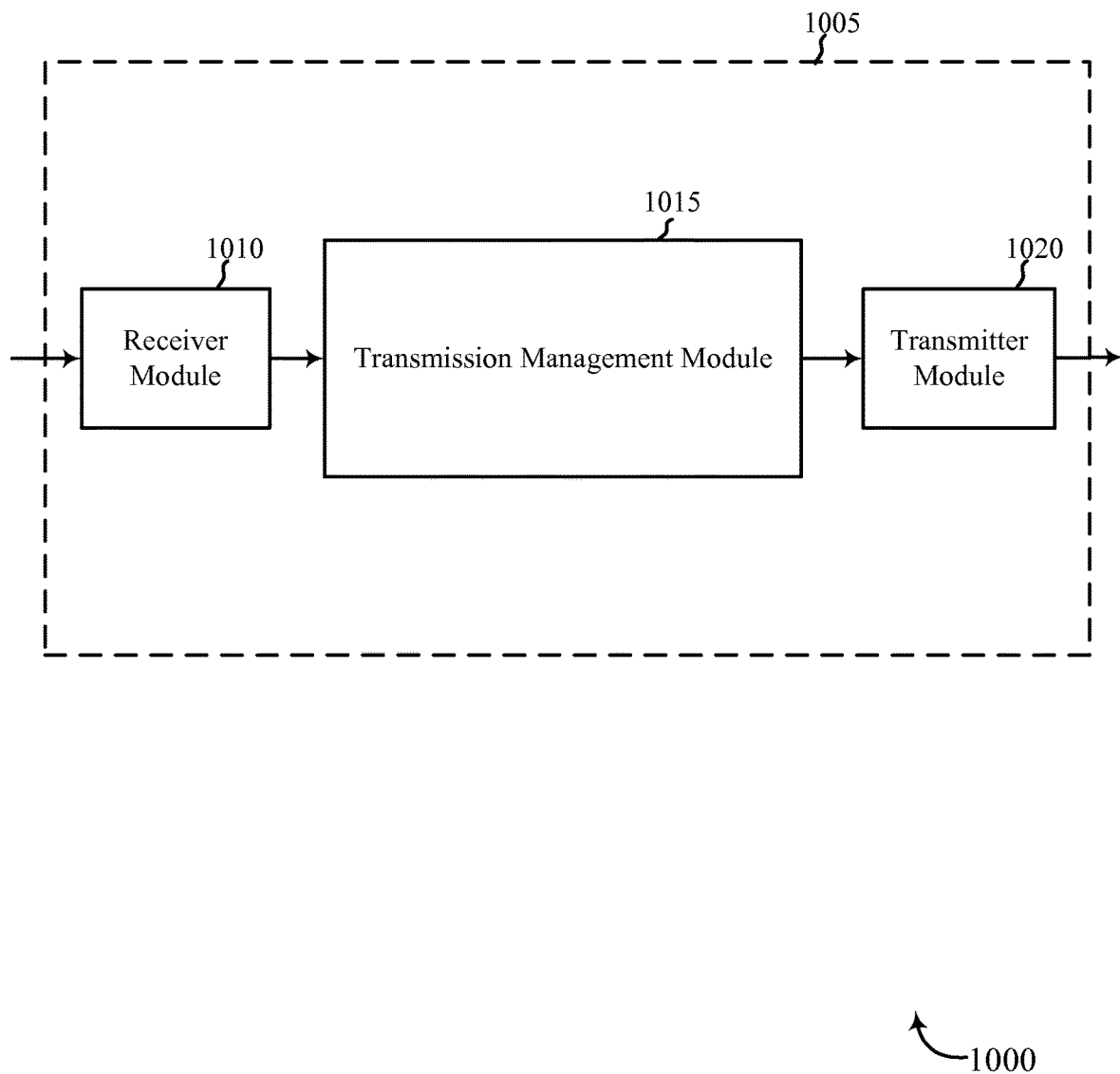
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIG. 1. In some examples, the apparatus 1005 may be part or include an LTE/LTE-A eNB and/or an LTE/LTE-A base station. The apparatus 1005 may also be a processor. The apparatus 1005 may include a receiver module 1010, a transmission management module 1015, and/or a transmitter module 1020. Each of these modules may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010 may include at least one radio frequency (RF) receiver, such as an RF receiver operable to uplink transmissions. The receiver module 1010 may be used to receive various types of data and/or control signals (i.e., transmissions) over one or more communication links of a wireless communication system, such as one or more communication links of the wireless communications system 100 described with reference to FIG. 1.

In some examples, the transmitter module 1020 may include at least one RF transmitter, such as at least one RF transmitter operable to transmit scheduling grants of uplink and downlink resources, and control signals that may indicate that a currently scheduled grant is to be preempted. The transmitter module 1020 may be used to transmit various types of data and/or control signals (i.e., transmissions) over one or more communication links of a wireless communication system, such as one or more communication links of the wireless communications system 100 described with reference to FIG. 1. The receiver module 1010 and the transmitter module 1020 may illustrate aspects of the transceiver module(s) 1250 described with reference to FIG. 12.

In some examples, the transmission management module 1015 may be configured to identify data to be transmitted in a data packet to a receiver, identify two or more coding schemes for coding the data, identify front and end portions of the data within the data packet with coding schemes for one or both of the front or end portions having a lower processing requirement than other portions of the data within the data packet, such as discussed above with respect to FIGS. 2-6. The transmission management module 1015 may provide the data and coding schemes to the transmitter module 1020 for transmission to one or more UEs.

Figure 11:
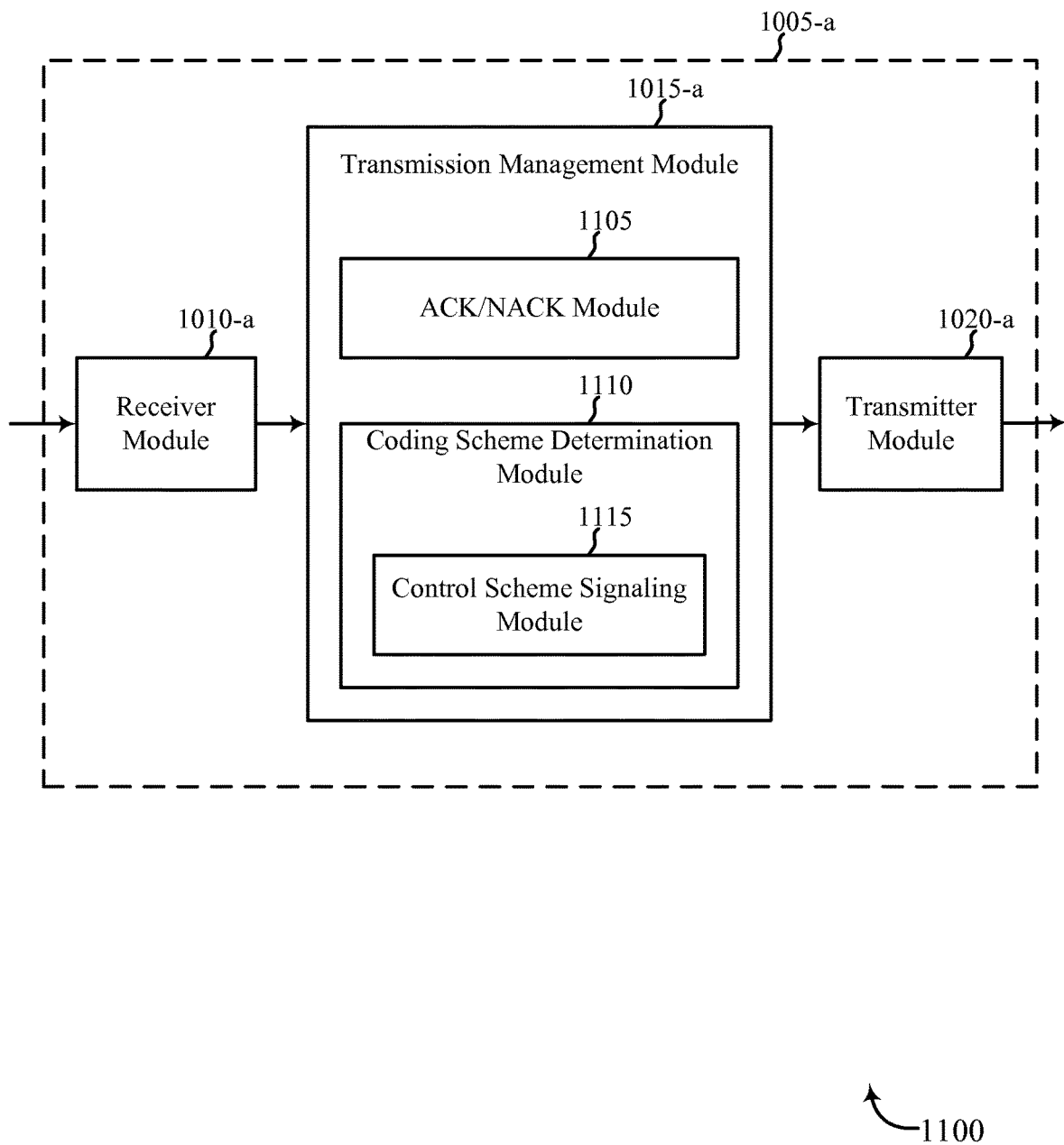
FIG. 11 shows a block diagram of an apparatus for use in wireless communication, in accordance with various aspects of the present disclosure.

FIG. 11 shows a block diagram 1100 of an apparatus 1005-a for use in wireless communication, in accordance with various aspects of the present disclosure. In some examples, the apparatus 1005-a may be an example of aspects of one or more of the base stations 105 described with reference to FIG. 1, and/or an example of aspects of the apparatus 1005 described with reference to FIG. 10. In some examples, the apparatus 1005-a may be part or include an LTE/LTE-A eNB and/or an LTE/LTE-A base station configured to transmit an eCC. The apparatus 1005-a may also be a processor. The apparatus 1005-a may include a receiver module 1010-a, a transmission management module 1015-a, and/or a transmitter module 1020-a. Each of these modules may be in communication with each other.

The components of the apparatus 1005-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 1010-a may be an example of one or more aspects of the receiver module 1010 described with reference to FIG. 10. In some examples, the receiver module 1010-a may include at least one radio frequency (RF) receiver, such as at least one RF receiver operable to receive uplink transmissions and data transmitted in uplink symbols of transmission from UEs. The receiver module 1010-a may be used to receive various types of data and/or control signals (i.e., transmissions) over one or more communication links of a wireless communication system, such as one or more communication links of the wireless communications system 100 described with reference to FIG. 1.

In some examples, the transmitter module 1020-a may be an example of one or more aspects of the transmitter module 1020 described with reference to FIG. 10. In some examples, the transmitter module 1020-a may include at least one RF transmitter, such as at least one RF transmitter operable to transmit grants of uplink and downlink resources, control signals for signaling coding schemes that are used for different portions of scheduled grants, and other control information (e.g., RRC, SIB, or PDCCH signaling, etc.). The transmitter module 1020-a may be used to transmit various types of data and/or control signals (i.e., transmissions) over one or more communication links of a wireless communications system, such as one or more communication links of the wireless communications system 100 described with reference to FIG. 1.

The transmission management module 1015-a may include an ACK/NACK module 1105, a coding scheme determination module 1110, and a coding scheme signaling module 1115. The receiver module 1010-a and the transmitter module 1020-a may perform the functions of the receiver module 1010 and the transmitter module 1020, of FIG. 10, respectively. The receiver module 1010-a and the transmitter module 1020-a may illustrate aspects of the transceiver module(s) 1250 described with reference to FIG. 12.

The ACK/NACK module 1105 may process received data and determine whether the data has been successfully received and decoded, and may generate feedback for transmission to a base station to acknowledge receipt of the data, such as discussed above with respect to FIGS. 2-6. In some examples, the ACK/NACK module 1105 may perform HARQ functions on received data and transmit associated ACK/NACK transmissions to a base station. The coding scheme determination module 1110 may determine coding schemes that are to be used for two or more different portions of transmissions, in a manner similar as discussed above with respect to FIGS. 2-6. The coding scheme signaling module 1115 may signal the different coding schemes to one or more UEs that are to receive the data transmissions, in a manner similar as discussed above with respect to FIGS. 2-6. In some examples, the signaling may be provided with a downlink grant, in RRC signaling, in a SIB, or in PDCCH signaling, to name but a few examples.

Figure 12:
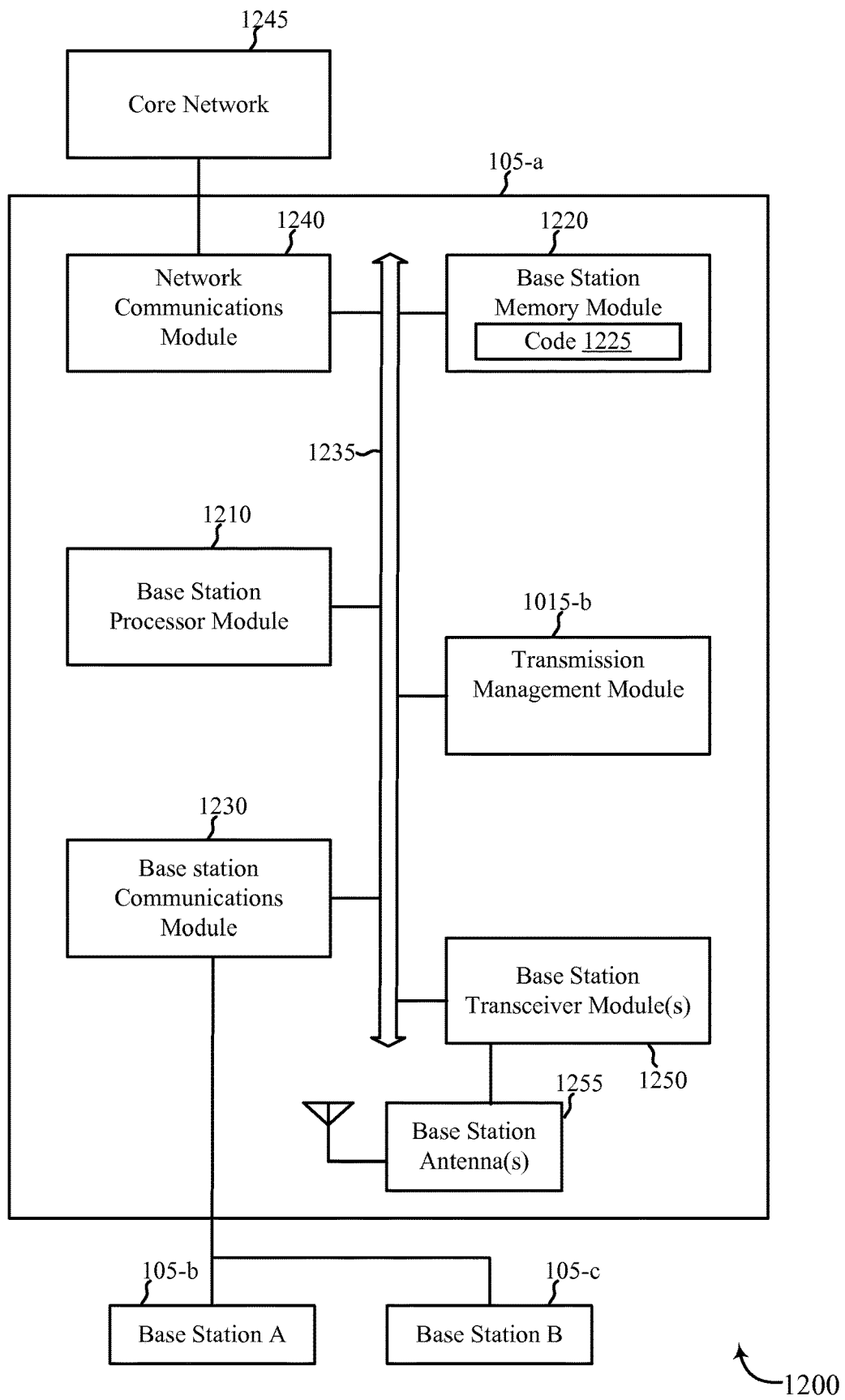
FIG. 12 shows a block diagram of a base station (e.g., a base station forming part or all of an eNB) for use in wireless communication, in accordance with various aspects of the present disclosure.

FIG. 12 shows a block diagram 1200 of a base station 105-a (e.g., a base station forming part or all of an eNB) for use in wireless communication, in accordance with various aspects of the present disclosure. In some examples, the base station 105-a may be an example of aspects of one or more of the base stations 105 described with reference to FIG. 1, and/or aspects of one or more of the apparatus 1005 when configured as a base station, as described with reference to FIGS. 10 and/or 11. The base station 105-a may be configured to implement or facilitate at least some of the base station and/or apparatus features and functions described with reference to FIGS. 2-6.

The base station 105-a may include a base station processor module 1210, a base station memory module 1220, at least one base station transceiver module (represented by base station transceiver module(s) 1250), at least one base station antenna (represented by base station antenna(s) 1255), and/or a transmission management module 1015-b. The base station 105-a may also include one or more of a base station communications module 1230 and/or a network communications module 1240. Each of these modules may be in communication with each other, directly or indirectly, over one or more buses 1235.

The base station memory module 1220 may include random access memory (RAM) and/or read-only memory (ROM). The base station memory module 1220 may store computer-readable, computer-executable software/firmware code 1225 containing instructions that are configured to, when executed, cause the base station processor module 1210 to perform various functions described herein related to wireless communication (e.g., coding scheme determination, transmission of data using different coding schemes, signaling of coding schemes, etc.). Alternatively, the computer-readable, computer-executable software/firmware code 1225 may not be directly executable by the base station processor module 1210 but be configured to cause the base station 105 (e.g., when compiled and executed) to perform various of the functions described herein.

The base station processor module 1210 may include an intelligent hardware device, e.g., a central processing unit (CPU), a microcontroller, an ASIC, etc. The base station processor module 1210 may process information received through the base station transceiver module(s) 1250, the base station communications module 1230, and/or the network communications module 1240. The base station processor module 1210 may also process information to be sent to the transceiver module(s) 1250 for transmission through the antenna(s) 1255, to the base station communications module 1230, for transmission to one or more other base stations 105-b and 105-c, and/or to the network communications module 1240 for transmission to a core network 1245, which may be an example of one or more aspects of the core network 130 described with reference to FIG. 1. The base station processor module 1210 may handle, alone or in connection with the transmission management module 1015-b, various aspects of coding of transmissions as discussed herein.

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in a first radio frequency spectrum band and/or a second radio frequency spectrum band. The base station transceiver module(s) 1250 may be configured to communicate bi-directionally, via the antenna(s) 1255, with one or more UEs or apparatuses, such as one or more of the UEs 115 described with reference to FIGS. 1 and/or 9. The base station 105-a may, for example, include multiple base station antennas 1255 (e.g., an antenna array). The base station 105-a may communicate with the core network 1245 through the network communications module 1240. The base station 105-a may also communicate with other base stations, such as the base stations 105-b and 105-c, using the base station communications module 1230.

The transmission management module 1015-b may be configured to perform and/or control some or all of the features and/or functions described with reference to FIGS. 2-6 related to determination of coding schemes for different portions of a transmission, signaling of coding scheme information, etc. The transmission management module 1015-b, or portions of the transmission management module 1015-b, may include a processor, and/or some or all of the functions of the transmission management module 1015-b may be performed by the base station processor module 1210 and/or in connection with the base station processor module 1210. In some examples, the transmission management module 1015-b may be an example of the transmission management module 1015 and/or 1015-a described with reference to FIGS. 10 and/or 11.

Figure 13:
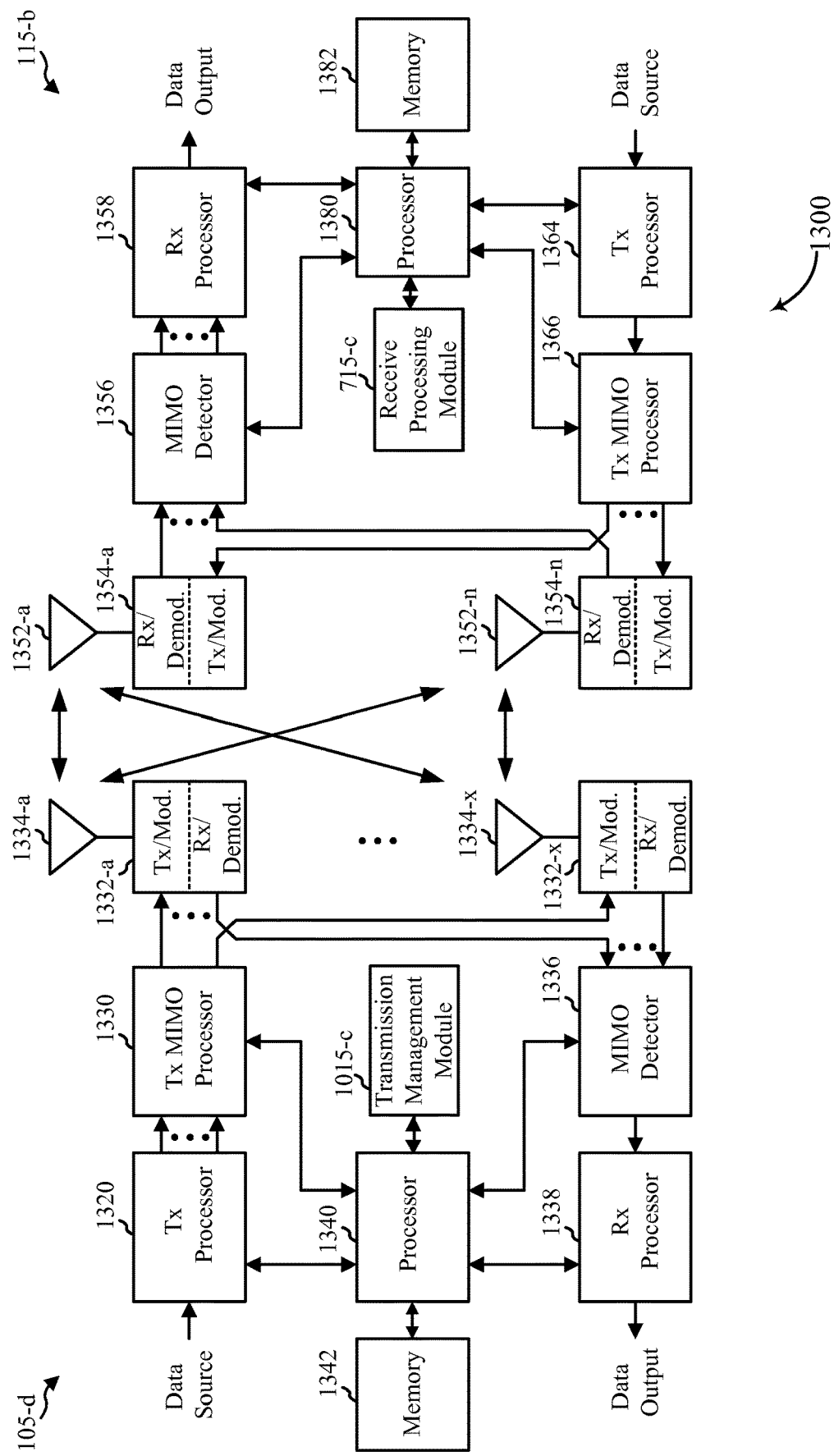
FIG. 13 shows a block diagram of a multiple-input/multiple-output communication system, in accordance with various aspects of the present disclosure.

FIG. 13 is a block diagram of a multiple input/multiple output (MIMO) communication system 1300 including a base station 105-d and a UE 115-b. The MIMO communication system 1300 may illustrate aspects of the wireless communications system 100 shown in FIG. 1. The base station 105-d may be equipped with antennas 1334-a through 1334-x, and the UE 115-b may be equipped with antennas 1352-a through 1352-n. In the MIMO communication system 1300, the base station 105-d may be able to send data over multiple communication links at the same time. Each communication link may be called a "layer" and the "rank" of the communication link may indicate the number of layers used for communication. For example, in a 2×2 MIMO communications system where base station 105-d transmits two "layers," the rank of the communication link between the base station 105-d and the UE 115-b is two.

At the base station 105-d, a transmit processor 1320 may receive data from a data source. The transmit processor 1320 may process the data. The transmit processor 1320 may also generate control symbols and/or reference symbols. A transmit (TX) MIMO processor 1330 may perform spatial processing (e.g., precoding) on data symbols, control symbols, and/or reference symbols, if applicable, and may provide output symbol streams to the modulators/demodulators 1332-a through 1332-x. Each modulator/demodulator 1332 may process a respective output symbol stream (e.g., for OFDM, etc.) to obtain an output sample stream. Each modulator/demodulator 1332 may further process (e.g., convert to analog, amplify, filter, and upconvert) the output sample stream to obtain a DL signal. In one example, DL signals from modulators/demodulators 1332-a through 1332-x may be transmitted via the antennas 1334-a through 1334-x, respectively.

At the UE 115-b, the antennas 1352-a through 1352-n may receive the DL signals from the base station 105-d and may provide the received signals to the demodulators 1354-a through 1354-n, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-a through 1354-n, perform MIMO detection on the received symbols, if applicable, and provide detected symbols. A receive processor 1358 may process (e.g., demodulate, deinterleave, and decode) the detected symbols, providing decoded data for the UE 115-b to a data output, and provide decoded control information to a processor 1380, or memory 1382.

The processor 1380 may in some cases execute stored instructions to instantiate one or more of a receive processing module 715-c. The receive processing module 715-c may be an example of aspects of the receive processing module 715 described with reference to FIGS. 7, 8 and/or 9.

On the uplink (UL), at the UE 115-b, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the demodulators 1354-a through 1354-n (e.g., for SC-FDMA, etc.), and be transmitted to the base station 105-d in accordance with the transmission parameters received from the base station 105-d. At the base station 105-d, the UL signals from the UE 115-b may be received by the antennas 1334, processed by the modulators/demodulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate one or more of a transmission management module 1015-c. The transmission management module 1015-c may be an example of aspects of the transmission management module 1015 described with reference to FIGS. 10, 11, and/or 12.

The components of the UE 115-b may, individually or collectively, be implemented with one or more ASICs adapted to perform some or all of the applicable functions in hardware. Each of the noted modules may be a means for performing one or more functions related to operation of the MIMO communication system 1300. Similarly, the components of the base station 105-c may, individually or collectively, be implemented with one or more ASICs adapted to perform some or all of the applicable functions in hardware.

Each of the noted components may be a means for performing one or more functions related to operation of the MIMO communication system 1300.

Figure 14:
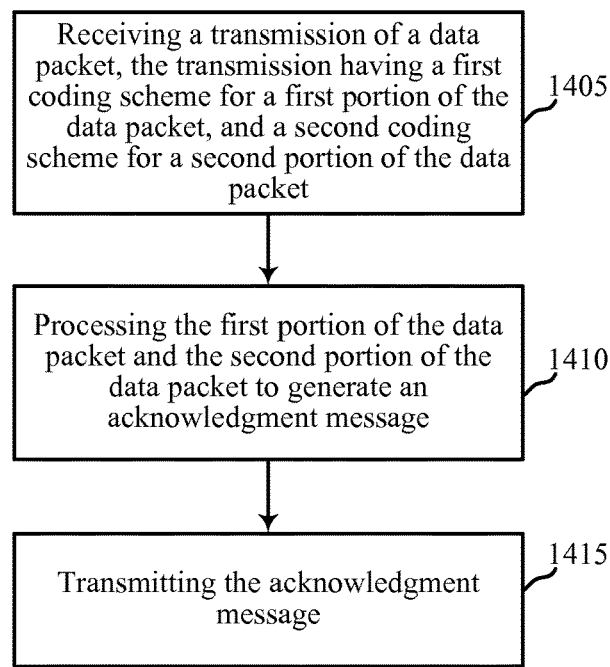
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIGS. 1, 9 and/or 13, and/or aspects of one or more of the devices 705 described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving a transmission of a data packet, the transmission having a first coding scheme for a first portion of the data packet, and a second coding scheme for a second portion of the data packet. The operation(s) at block 1405 may be performed using the receive processing module 715 described with reference to FIGS. 7-9 and/or 13. In some examples, the operation(s) at block 1405 are performed by the transceiver module 935 described with reference to FIG. 9.

At block 1410, the method 1400 may include processing the first portion of the data packet and the second portion of the data packet to generate an acknowledgment message. The operation(s) at block 1410 may be performed using the receive processing module 715 described with reference to FIGS. 7-9 and/or 13. In some examples, the operation(s) at block 1410 are performed by the processor module 905 described with reference to FIG. 9.

At block 1415, the method 1400 may include transmitting the acknowledgment message. The operation(s) at block 1415 may be performed using the Receive processing module 715 described with reference to FIGS. 7-9 and/or 13. In some examples, the operation(s) at block 1415 are performed by the transceiver module 935 described with reference to FIG. 9.

Thus, the method 1400 may provide for wireless communication. It should be noted that the method 1400 is just one implementation and that the operations of the method 1400 may be rearranged or otherwise modified such that other implementations are possible.

Figure 15:
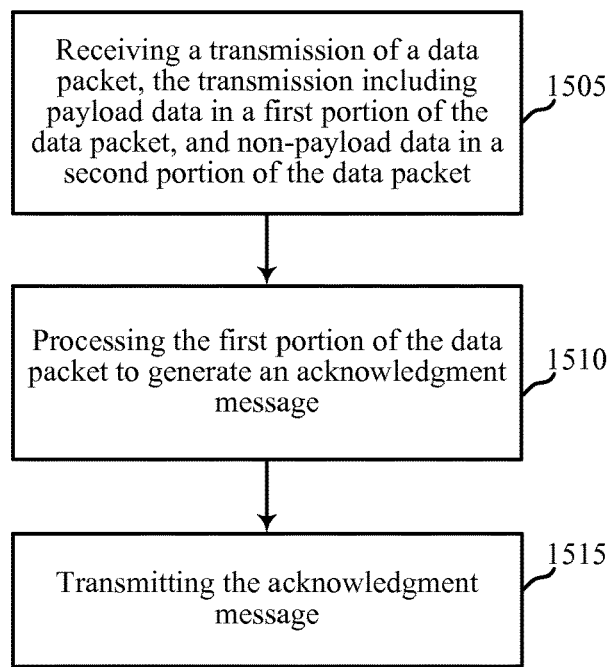
FIG. 15 is a flow chart illustrating another example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIGS. 1, 9 and/or 13, and/or aspects of one or more of the devices 705 described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving a transmission of a data packet, the transmission including payload data in a first portion of the data packet, and non-payload data in a second portion of the data packet. The operation(s) at block 1505 may be performed using the receive processing module 715 described with reference to FIGS. 7-9 and/or 13. In some examples, the operation(s) at block 1505 are performed by the transceiver module 935 described with reference to FIG. 9.

At block 1510, the method 1500 may include processing the first portion of the data packet to generate an acknowledgment message. The operation(s) at block 1510 may be performed using the receive processing module 715 described with reference to FIGS. 7-9 and/or 13. In some examples, the operation(s) at block 1510 are performed by the processor module 905 described with reference to FIG. 9.

At block 1515, the method 1500 may include transmitting the acknowledgment message. The operation(s) at block 1515 may be performed using the Receive processing module 715 described with reference to FIGS. 7-9 and/or 13. In some examples, the operation(s) at block 1515 are performed by the transceiver module 935 described with reference to FIG. 9.

Thus, the method 1500 may provide for wireless communication. It should be noted that the method 1500 is just one implementation and that the operations of the method 1500 may be rearranged or otherwise modified such that other implementations are possible.

Figure 16:
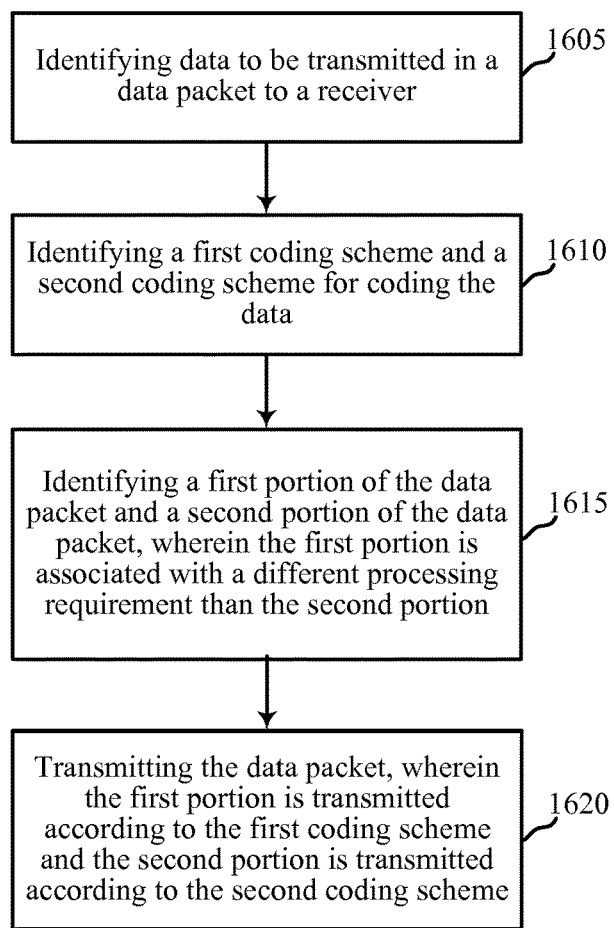
FIG. 16 is a flow chart illustrating another example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105 described with reference to FIGS. 1, 12 and/or 13, and/or aspects of one or more of the apparatuses 1005 described with reference to FIGS. 10 and/or 11. In some examples, a UE may execute one or more sets of codes to control the functional elements of the base station to perform the functions described below. Additionally or alternatively, the base station may perform one or more of the functions described below using special-purpose hardware.

At block 1605, the method 1600 may include identifying data to be transmitted in a data packet to a receiver. The operation(s) at block 1605 may be performed using the transmission management module 1015 described with reference to FIGS. 10-13. In some examples, the operation(s) at block 1605 are performed by the base station processor module 1210 described with reference to FIG. 12.

At block 1610, the method 1600 may include identifying a first coding scheme and a second coding scheme for coding the data. The operation(s) at block 1610 may be performed using the transmission management module 1015 described with reference to FIGS. 10-13. In some examples, the operation(s) at block 1610 are performed by the base station processor module 1210 described with reference to FIG. 12.

At block 1615, the method 1600 may include identifying a first portion of the data packet and a second portion of the data packet, wherein the first portion of the data packet is associated with a different processing requirement than the second portion of the data packet. The operation(s) at block 1615 may be performed using the transmission management module 1015 described with reference to FIGS. 10-13. In some examples, the operation(s) at block 1615 are performed by the base station processor module 1210 described with reference to FIG. 12.

At block 1620, the method 1600 may include transmitting the data packet, wherein the first portion of the data packet is transmitted according to the first coding scheme and the second portion of the data packet is transmitted according to the second coding scheme. The operation(s) at block 1620 may be performed using the transmission management module 1015 described with reference to FIGS. 10-13. In some examples, the operation(s) at block 1620 are performed by the base station transceiver module(s) 1250 described with reference to FIG. 12.

Thus, the method 1600 may provide for wireless communication. It should be noted that the method 1600 is just one implementation and that the operations of the method 1600 may be rearranged or otherwise modified such that other implementations are possible.

Figure 17:
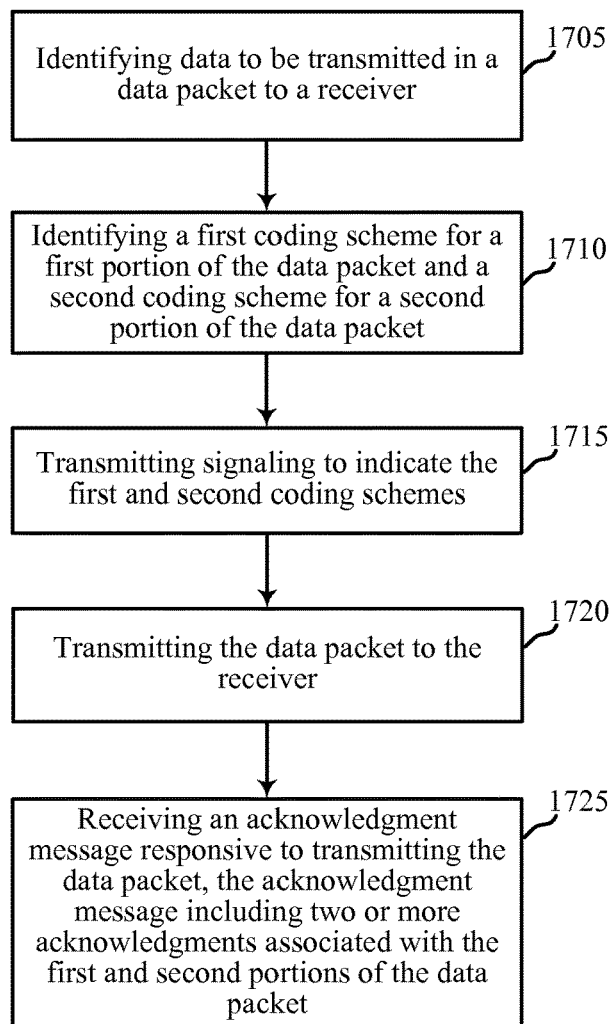
FIG. 17 is a flow chart illustrating another example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105 described with reference to FIGS. 1, 12 and/or 13, and/or aspects of one or more of the apparatuses 1005 described with reference to FIGS. 10 and/or 11. In some examples, a UE may execute one or more sets of codes to control the functional elements of the base station to perform the functions described below. Additionally or alternatively, the base station may perform one or more of the functions described below using special-purpose hardware.

At block 1705, the method 1700 may include Identifying data to be transmitted in a data packet to a receiver. The operation(s) at block 1705 may be performed using the transmission management module 1015 described with reference to FIGS. 10-13. In some examples, the operation(s) at block 1705 are performed by the base station processor module 1210 described with reference to FIG. 12.

At block 1710, the method 1700 may include identifying a first coding scheme for a first portion of the data packet and a second coding scheme for a second portion of the data packet. The operation(s) at block 1710 may be performed using the transmission management module 1015 described with reference to FIGS. 10-13. In some examples, the operation(s) at block 1710 are performed by the base station processor module 1210 described with reference to FIG. 12.

At block 1715, the method 1700 may include transmitting signaling to indicate the first and second coding schemes. The operation(s) at block 1715 may be performed using the transmission management module 1015 described with reference to FIGS. 10-13. In some examples, the operation(s) at block 1715 are performed by the base station processor module 1210 described with reference to FIG. 12.

At block 1720, the method 1700 may include transmitting the data packet to the receiver. The operation(s) at block 1720 may be performed using the transmission management module 1015 described with reference to FIGS. 10-13. In some examples, the operation(s) at block 1720 are performed by the base station transceiver module(s) 1250 described with reference to FIG. 12.

At block 1725, the method 1700 may include receiving an acknowledgment message responsive to transmitting the data packet, the acknowledgment transmission including two or more acknowledgments associated with the first and second portions of the data packet. The operation(s) at block 1725 may be performed using the transmission management module 1015 described with reference to FIGS. 10-13. In some examples, the operation(s) at block 1725 are performed by the base station transceiver module(s) 1250 described with reference to FIG. 12.

Thus, the method 1700 may provide for wireless communication. It should be noted that the method 1700 is just one implementation and that the operations of the method 1700 may be rearranged or otherwise modified such that other implementations are possible.

In some examples, aspects from two or more of the methods 1400, 1500, 1600, or 1700 may be combined. It should be noted that the methods 1400, 1500, 1600, 1700 are just example implementations, and that the operations of the methods 1400-1700 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying data to be transmitted in a data packet to a receiver;
   identifying a first coding scheme and a second coding scheme for coding the data;
   signaling, to the receiver, the first coding scheme and the second coding scheme for coding the data packet, the signaling transmitted in a control channel transmission;
   identifying a first portion of the data packet and a second portion of the data packet, wherein the first portion of the data packet is associated with a first processing requirement for acknowledging, by the receiver, the first portion of the data packet, and wherein the second portion of the data packet is associated with a second processing requirement for acknowledging the second portion of the data packet, the second processing requirement being different than the first processing requirement;
   transmitting the data packet, wherein the first portion of the data packet is transmitted according to the first coding scheme and the second portion of the data packet is transmitted according to the second coding scheme, wherein the first coding scheme uses a first transport block size for the first portion of the data packet, and the second coding scheme uses a second transport block size for the second portion of the data packet that is different than the first transport block size; and
   receiving an acknowledgment message responsive to transmitting the data packet, wherein the acknowledgment message comprises at least one acknowledgment associated with the first portion of the data packet and at least one acknowledgment associated with the second portion of the data packet.

2. The method of claim 1, wherein the first coding scheme uses a first code rate, and the second coding scheme uses a second code rate that is reduced relative to the first code rate.

3. The method of claim 1, wherein the first coding scheme uses a first code rate, and the second coding scheme uses a second code rate that is increased relative to the first code rate.

4. The method of claim 1, wherein the second transport block size is smaller than the first transport block size.

5. The method of claim 1, wherein the second transport block size is larger than the first transport block size.

6. The method of claim 1, wherein the second portion of the data packet comprises non-data related information associated with the data packet, and the first portion of the data packet comprises payload data associated with the data packet.

7. The method of claim 1, wherein the second portion of the data packet has reduced requirements for one or more of blind detection, control channel processing or channel state information (CSI) computation relative to the first portion of the data packet.

8. The method of claim 1, wherein the second portion of the data packet comprises a tail portion of the data packet and the first portion of the data packet comprises a head portion of the data packet.

9. The method of claim 1, wherein the second portion of the data packet comprises a head portion of the data packet and the first portion of the data packet comprises a tail portion of the data packet.

10. The method of claim 1, further comprising:
identifying a third coding scheme for coding the data; and
identifying a third portion of the data packet, wherein the third portion of the data packet is associated with a different processing requirement than the first portion of the data packet or the second portion of the data packet, or both the first portion of the data packet and the second portion of the data packet;
wherein the third portion of the data packet is transmitted according to the third coding scheme.

11. The method of claim 10, wherein the first coding scheme uses a first code rate, the second coding scheme uses a second code rate that is reduced relative to the first code rate, and the third coding scheme uses a third code rate that is reduced relative to the second code rate.

12. The method of claim 10, wherein the first coding scheme uses a first code rate, the second coding scheme uses a second code rate that is increased relative to the first code rate, and the third coding scheme uses a third code rate that is reduced relative to the second code rate.

13. The method of claim 10, wherein the first portion of the data packet comprises a head portion of the data packet, the second portion of the data packet comprises a middle portion of the data packet, and the third portion of the data packet comprises a tail portion of the data packet.

14. An apparatus for wireless communication, comprising:
means for identifying data to be transmitted in a data packet to a receiver;
means for identifying a first coding scheme and a second coding scheme for coding the data;
means for signaling, to the receiver, the first coding scheme and the second coding scheme for coding the data packet, the signaling transmitted in a control channel transmission;
means for identifying a first portion of the data packet and a second portion of the data packet, wherein the first portion of the data packet is associated with a first processing requirement for acknowledging, by the receiver, the first portion of the data packet, and wherein the second portion of the data packet is associated with a second processing requirement for acknowledging the second portion of the data packet, the second processing requirement being different than the first processing requirement;
means for transmitting the data packet, wherein the first portion of the data packet is transmitted according to the first coding scheme and the second portion of the data packet is transmitted according to the second coding scheme, wherein the first coding scheme uses a first transport block size for the first portion of the data packet, and the second coding scheme uses a second transport block size for the second portion of the data packet that is different than the first transport block size; and
means for receiving an acknowledgment message responsive to transmitting the data packet, wherein the acknowledgment message comprises at least one acknowledgment associated with the first portion of the data packet and at least one acknowledgment associated with the second portion of the data packet.

15. The apparatus of claim 14, wherein the first coding scheme uses a first code rate, and the second coding scheme uses a second code rate that is reduced relative to the first code rate.

16. The apparatus of claim 14, wherein the first coding scheme uses a first code rate, and the second coding scheme uses a second code rate that is increased relative to the first code rate.

17. The apparatus of claim 14, wherein the second transport block size is smaller than the first transport block size.

18. The apparatus of claim 14, wherein the second transport block size is larger than the first transport block size.

19. The apparatus of claim 14, wherein the second portion of the data packet comprises non-data related information associated with the data packet, and the first portion of the data packet comprises payload data associated with the data packet.

20. The apparatus of claim 14, wherein the second portion of the data packet has reduced requirements for one or more of blind detection, control channel processing or channel state information (CSI) computation relative to the first portion of the data packet.

21. The apparatus of claim 14, wherein the second portion of the data packet comprises a tail portion of the data packet and the first portion of the data packet comprises a head portion of the data packet.

22. The apparatus of claim 14, wherein the second portion of the data packet comprises a head portion of the data packet and the first portion of the data packet comprises a tail portion of the data packet.

23. The apparatus of claim 14, further comprising:
means for identifying a third coding scheme for coding the data; and
means for identifying a third portion of the data packet, wherein the third portion of the data packet is associated with a different processing requirement than the first portion of the data packet or the second portion of the data packet, or both the first portion of the data packet and the second portion of the data packet;
wherein the third portion of the data packet is transmitted according to the third coding scheme.

24. The apparatus of claim 23, wherein the first coding scheme uses a first code rate, the second coding scheme uses a second code rate that is reduced relative to the first code rate, and the third coding scheme uses a third code rate that is reduced relative to the second code rate.

25. The apparatus of claim 23, wherein the first coding scheme uses a first code rate, the second coding scheme uses a second code rate that is increased relative to the first code rate, and the third coding scheme uses a third code rate that is reduced relative to the second code rate.

26. The apparatus of claim 23, wherein the first portion of the data packet comprises a head portion of the data packet, the second portion of the data packet comprises a middle portion of the data packet, and the third portion of the data packet comprises a tail portion of the data packet.

27. An apparatus for wireless communication, comprising:
a processor;
memory coupled with the processor; and
instructions stored in the memory, the instructions being executable by the processor to cause the apparatus to:
identify data to be transmitted in a data packet to a receiver;
identify a first coding scheme and a second coding scheme for coding the data;
signal, to the receiver, the first coding scheme and the second coding scheme for coding the data packet, the signaling transmitted in a control channel transmission;

identify a first portion of the data packet and a second portion of the data packet, wherein the first portion of the data packet is associated with a first processing requirement for acknowledging, by the receiver, the first portion of the data packet, and wherein the second portion of the data packet is associated with a second processing requirement for acknowledging the second portion of the data packet, the second processing requirement being different than the first processing requirement;

transmit the data packet, wherein the first portion of the data packet is transmitted according to the first coding scheme and the second portion of the data packet is transmitted according to the second coding scheme, wherein the first coding scheme uses a first transport block size for the first portion of the data packet, and the second coding scheme uses a second transport block size for the second portion of the data packet that is different than the first transport block size; and receive an acknowledgment message responsive to transmitting the data packet, wherein the acknowledgment message comprises at least one acknowledgment associated with the first portion of the data packet and at least one acknowledgment associated with the second portion of the data packet.

28. The apparatus of claim 27, wherein the first coding scheme uses a first code rate, and the second coding scheme uses a second code rate that is reduced relative to the first code rate.

29. The apparatus of claim 27, wherein the first coding scheme uses a first code rate, and the second coding scheme uses a second code rate that is increased relative to the first code rate.

30. The apparatus of claim 27, wherein the second transport block size is smaller than the first transport block size.

31. The apparatus of claim 27, wherein the second transport block size is larger than the first transport block size.

32. The apparatus of claim 27, wherein the second portion of the data packet comprises non-data related information associated with the data packet, and the first portion of the data packet comprises payload data associated with the data packet.

33. The apparatus of claim 27, wherein the second portion of the data packet has reduced requirements for one or more of blind detection, control channel processing or channel state information (CSI) computation relative to the first portion of the data packet.

34. The apparatus of claim 27, wherein the second portion of the data packet comprises a tail portion of the data packet and the first portion of the data packet comprises a head portion of the data packet.

35. The apparatus of claim 27, wherein the second portion of the data packet comprises a head portion of the data packet and the first portion of the data packet comprises a tail portion of the data packet.

36. The apparatus of claim 27, wherein the instructions are further executable by the processor to cause the apparatus to:

identify a third coding scheme for coding the data;
identify a third portion of the data packet, wherein the third portion of the data packet is associated with a different processing requirement than the first portion of the data packet or the second portion of the data packet, or both the first portion of the data packet and the second portion of the data packet; and transmit the third portion of the data packet according to the third coding scheme.

37. The apparatus of claim 36, wherein the first coding scheme uses a first code rate, the second coding scheme uses a second code rate that is reduced relative to the first code rate, and the third coding scheme uses a third code rate that is reduced relative to the second code rate.

38. The apparatus of claim 36, wherein the first coding scheme uses a first code rate, the second coding scheme uses a second code rate that is increased relative to the first code rate, and the third coding scheme uses a third code rate that is reduced relative to the second code rate.

39. The apparatus of claim 36, wherein the first portion of the data packet comprises a head portion of the data packet, the second portion of the data packet comprises a middle portion of the data packet, and the third portion of the data packet comprises a tail portion of the data packet.

40. A non-transitory computer-readable medium storing computer-executable code for wireless communication, the code executable by a processor to:

identify data to be transmitted in a data packet to a receiver;
identify a first coding scheme and a second coding scheme for coding the data;
signal, to the receiver, the first coding scheme and the second coding scheme for coding the data packet, the signaling transmitted in a control channel transmission;
identify a first portion of the data packet and a second portion of the data packet, wherein the first portion of the data packet is associated with a first processing requirement for acknowledging, by the receiver, the first portion of the data packet, and wherein the second portion of the data packet is associated with a second processing requirement for acknowledging the second portion of the data packet, the second processing requirement being different than the first processing requirement;
transmit the data packet, wherein the first portion of the data is transmitted according to the first coding scheme and the second portion of the data packet is transmitted according to the second coding scheme, wherein the first coding scheme uses a first transport block size for the first portion of the data packet, and the second coding scheme uses a second transport block size for the second portion of the data packet that is different than the first transport block size; and
receiving an acknowledgment message responsive to transmitting the data packet, wherein the acknowledgment message comprises at least one acknowledgment associated with the first portion of the data packet and at least one acknowledgment associated with the second portion of the data packet.

41. A method for wireless communication, comprising:
receiving signaling indicating a first coding scheme and a second coding scheme for coding a data packet, the signaling transmitted in a control channel transmission;
receiving a transmission of the data packet, the transmission using the first coding scheme for a first portion of the data packet, and using the second coding scheme for a second portion of the data packet, wherein the first portion of the data packet is associated with a first processing requirement for acknowledging the first portion of the data packet, and wherein the second portion of the data packet is associated with a second processing requirement for acknowledging the second portion of the data packet, the second processing requirement being different than the first processing requirement;

processing the first portion of the data packet and the second portion of the data packet based on the received signaling to generate an acknowledgment message, wherein the first coding scheme uses a first transport block size for the first portion of the data packet, and the second coding scheme uses a second transport block size for the second portion of the data packet that is different than the first transport block size; and transmitting the acknowledgment message, wherein the acknowledgment message comprises at least one acknowledgment associated with the first portion of the data packet and at least one acknowledgment associated with the second portion of the data packet.

42. The method of claim 41, wherein the first coding scheme uses a first code rate for the first portion of the data packet, and the second coding scheme uses a second code rate for the second portion of the data packet that is reduced relative to the first code rate.

43. The method of claim 41, wherein the second transport block size is smaller than the first transport block size.

44. The method of claim 41, wherein the first portion of the data packet provides payload data associated with the data packet, and the second portion of the data packet provides non-payload data related information associated with the data packet.

45. The method of claim 41, wherein the second portion of the data packet has reduced requirements for one or more of blind detection, control channel processing or channel state information (CSI) computation relative to the first portion of the data packet.

46. The method of claim 41, wherein the processing comprises:

processing the first portion of the data packet while receiving the second portion of the data packet; and processing the second portion of the data packet after receiving the second portion of the data packet, wherein the processing of the second portion of the data packet is less computationally intensive than processing of the first portion of the data packet.

47. The method of claim 41, wherein the first portion of the data packet comprises a head portion of the data packet and the second portion of the data packet comprises a tail portion of the data packet.

48. The method of claim 41, wherein the first portion of the data packet comprises a tail portion of the data packet and the second portion of the data packet comprises a head portion of the data packet.

49. The method of claim 41, wherein the first coding scheme uses a first code rate for the first portion of the data packet, and the second coding scheme uses a second code rate for the second portion of the data packet that is increased relative to the first code rate.

50. The method of claim 41, wherein the first coding scheme provides a higher likelihood of successful decoding the first portion of the data packet and provides information for determining a more accurate channel estimate that is used to support second code rate.

51. The method of claim 41, wherein the second transport block size is larger than the first transport block size.

52. The method of claim 41, wherein:

the first coding scheme uses a first spatial scheme and the second coding scheme uses a second spatial scheme; or the first coding scheme uses a first set of antenna ports and the second coding scheme uses a second set of antenna ports; or the first coding scheme uses a first subset of resource elements for the first portion of the data packet, and the second coding scheme uses a different subset of resource elements for the second portion of the data packet.

53. The method of claim 41, wherein a lower rank is used for the first coding scheme and a higher rank is used for the second coding scheme.

54. The method of claim 41, wherein the first portion of the data packet and the second portion of the data packet use different transmission schemes.

55. The method of claim 41, further comprising:

processing a third portion of the data packet to generate the acknowledgement message, wherein the transmission has a third coding scheme for the third portion of the data packet, and wherein the third coding scheme has different processing requirements relative to the first coding scheme or the second coding scheme, or both the first coding scheme and the second coding scheme.

56. The method of claim 55, wherein the first coding scheme uses a first code rate, the second coding scheme uses a second code rate that is reduced relative to the first code rate, and the third coding scheme uses a third code rate that is reduced relative to the second code rate.

57. The method of claim 55, wherein the first coding scheme uses a first code rate, the second coding scheme uses a second code rate that is increased relative to the first code rate, and the third coding scheme uses a third code rate that is reduced relative to the second code rate.

58. The method of claim 55, wherein the first portion of the data packet comprises a head portion of the data packet, the second portion of the data packet comprises a middle portion of the data packet, and the third portion of the data packet comprises a tail portion of the data packet.

59. An apparatus for wireless communication, comprising:

means for receiving signaling indicating a first coding scheme and a second coding scheme for coding a data packet, the signaling transmitted in a control channel transmission;

means for receiving a transmission of the data packet, the transmission using the first coding scheme for a first portion of the data packet, and using the second coding scheme for a second portion of the data packet, wherein the first portion of the data packet is associated with a first processing requirement for acknowledging the first portion of the data packet, and wherein the second portion of the data packet is associated with a second processing requirement for acknowledging the second portion of the data packet, the second processing requirement being different than the first processing requirement;

means for processing the first portion of the data packet and the second portion of the data packet based on the received signaling to generate an acknowledgment message, wherein the first coding scheme uses a first transport block size for the first portion of the data packet, and the second coding scheme uses a second transport block size for the second portion of the data packet that is different than the first transport block size; and means for transmitting the acknowledgment message, wherein the acknowledgment message comprises at least one acknowledgment associated with the first portion of the data packet and at least one acknowledgment associated with the second portion of the data packet.

60. The apparatus of claim 59, wherein the first coding scheme uses a first code rate for the first portion of the data packet, and the second coding scheme uses a second code rate for the second portion of the data packet that is reduced relative to the first code rate.

61. The apparatus of claim 59, wherein the second transport block size is smaller than the first transport block size.

62. The apparatus of claim 59, wherein the first portion of the data packet provides payload data associated with the data packet, and the second portion of the data packet provides non-payload data related information associated with the data packet.

63. The apparatus of claim 59, wherein the second portion of the data packet has reduced requirements for one or more of blind detection, control channel processing or channel state information (CSI) computation relative to the first portion of the data packet.

64. The apparatus of claim 59, wherein the means for processing is operable to processes the first portion of the data packet while receiving the second portion of the data packet and to processes the second portion of the data packet after receiving the second portion of the data packet, wherein a processing of the second portion of the data packet is less computationally intensive than processing of the first portion of the data packet.

65. The apparatus of claim 59, wherein the first portion of the data packet comprises a head portion of the data packet and the second portion of the data packet comprises a tail portion of the data packet.

66. The apparatus of claim 59, wherein the first portion of the data packet comprises a tail portion of the data packet and the second portion of the data packet comprises a head portion of the data packet.

67. The apparatus of claim 59, wherein the first coding scheme uses a first code rate for the first portion of the data packet, and the second coding scheme uses a second code rate for the second portion of the data packet that is increased relative to the first code rate.

68. The apparatus of claim 59, wherein the first coding scheme provides a higher likelihood of successful decoding the first portion of the data packet and provides information for determining a more accurate channel estimate that is used to support second code rate.

69. The apparatus of claim 59, wherein the second transport block size is larger than the first transport block size.

70. The apparatus of claim 59, wherein:
the first coding scheme uses a first spatial scheme and the second coding scheme uses a second spatial scheme; or
the first coding scheme uses a first set of antenna ports and the second coding scheme uses a second set of antenna ports; or
the first coding scheme uses a first subset of resource elements for the first portion of the data packet, and the second coding scheme uses a different subset of resource elements for the second portion of the data packet.

71. The apparatus of claim 59, wherein a lower rank is used for the first coding scheme and a higher rank is used for the second coding scheme.

72. The apparatus of claim 59, wherein the means for processing the first portion of the data packet and the second portion of the data packet to generate the acknowledgment message is operable to:

process a third portion of the data packet to generate the acknowledgement message, wherein the transmission has a third coding scheme for the third portion of the data packet, and wherein the third coding scheme has different processing requirements relative to the first coding scheme or the second coding scheme, or both the first coding scheme and the second coding scheme.

73. The apparatus of claim 72, wherein the first coding scheme uses a first code rate, the second coding scheme uses a second code rate that is reduced relative to the first code rate, and the third coding scheme uses a third code rate that is reduced relative to the second code rate.

74. The apparatus of claim 72, wherein the first coding scheme uses a first code rate, the second coding scheme uses a second code rate that is increased relative to the first code rate, and the third coding scheme uses a third code rate that is reduced relative to the second code rate.

75. The apparatus of claim 72, wherein the first portion of the data packet comprises a head portion of the data packet, the second portion of the data packet comprises a middle portion of the data packet, and the third portion of the data packet comprises a tail portion of the data packet.

76. An apparatus for wireless communication, comprising:
a processor;
memory coupled with the processor; and
instructions stored in the memory, the instructions being executable by the processor to cause the apparatus to:
receive signaling indicating a first coding scheme and a second coding scheme for coding a data packet, the signaling transmitted in a control channel transmission;
receive a transmission of the data packet, the transmission using the first coding scheme for a first portion of the data packet, and using the second coding scheme for a second portion of the data packet, wherein the first portion of the data packet is associated with a first processing requirement for acknowledging the first portion of the data packet, and wherein the second portion of the data packet is associated with a second processing requirement for acknowledging the second portion of the data packet, the second processing requirement being different than the first processing requirement;
process the first portion of the data packet and the second portion of the data packet based on the received signaling to generate an acknowledgment message, wherein the first coding scheme uses a first transport block size for the first portion of the data packet, and the second coding scheme uses a second transport block size for the second portion of the data packet that is different than the first transport block size; and
transmit the acknowledgment message, wherein the acknowledgment message comprises at least one acknowledgment associated with the first portion of the data packet and at least one acknowledgment associated with the second portion of the data packet.

77. The apparatus of claim 76, wherein the first coding scheme uses a first code rate for the first portion of the data packet, and the second coding scheme uses a second code rate for the second portion of the data packet that is reduced relative to the first code rate.

78. The apparatus of claim 76, wherein the second transport block size is smaller than the first transport block size.

79. The apparatus of claim 76, wherein the first portion of the data packet provides payload data associated with the data packet, and the second portion of the data packet provides non-payload data related information associated with the data packet.

80. The apparatus of claim 76, wherein the second portion of the data packet has reduced requirements for one or more of blind detection, control channel processing or channel state information (CSI) computation relative to the first portion of the data packet.

81. The apparatus of claim 76, wherein the instructions are further executable by the processor to cause the apparatus to:
  process the first portion of the data packet while receiving the second portion of the data packet; and
  process the second portion of the data packet after receiving the second portion of the data packet, wherein the processing of the second portion of the data packet is less computationally intensive than processing of the first portion of the data packet.

82. The apparatus of claim 76, wherein the first portion of the data packet comprises a head portion of the data packet and the second portion of the data packet comprises a tail portion of the data packet.

83. The apparatus of claim 76, wherein the first portion of the data packet comprises a tail portion of the data packet and the second portion of the data packet comprises a head portion of the data packet.

84. The apparatus of claim 76, wherein the first coding scheme uses a first code rate for the first portion of the data packet, and the second coding scheme uses a second code rate for the second portion of the data packet that is increased relative to the first code rate.

85. The apparatus of claim 76, wherein the first coding scheme provides a higher likelihood of successful decoding the first portion of the data packet and provides information for determining a more accurate channel estimate that is used to support second code rate.

86. The apparatus of claim 76, wherein the second transport block size is larger than the first transport block size.

87. The apparatus of claim 76, wherein:
  the first coding scheme uses a first spatial scheme and the second coding scheme uses a second spatial scheme; or
  the first coding scheme uses a first set of antenna ports and the second coding scheme uses a second set of antenna ports; or
  the first coding scheme uses a first subset of resource elements for the first portion of the data packet, and the second coding scheme uses a different subset of resource elements for the second portion of the data packet.

88. The apparatus of claim 76, wherein a lower rank is used for the first coding scheme and a higher rank is used for the second coding scheme.

89. The apparatus of claim 76, wherein the first portion of the data packet and the second portion of the data packet use different transmission schemes.

90. The apparatus of claim 76, wherein the instructions are further executable by the processor to cause the apparatus to:
  process a third portion of the data packet to generate the acknowledgement message, wherein the transmission has a third coding scheme for the third portion of the data packet, and wherein the third coding scheme has different processing requirements relative to the first coding scheme or the second coding scheme, or both the first coding scheme and the second coding scheme.

91. The apparatus of claim 90, wherein the first coding scheme uses a first code rate, the second coding scheme uses a second code rate that is reduced relative to the first code rate, and the third coding scheme uses a third code rate that is reduced relative to the second code rate.

92. The apparatus of claim 90, wherein the first coding scheme uses a first code rate, the second coding scheme uses a second code rate that is increased relative to the first code rate, and the third coding scheme uses a third code rate that is reduced relative to the second code rate.

93. The apparatus of claim 90, wherein the first portion of the data packet comprises a head portion of the data packet, the second portion of the data packet comprises a middle portion of the data packet, and the third portion of the data packet comprises a tail portion of the data packet.

94. A non-transitory computer-readable medium storing computer-executable code for wireless communication, the code executable by a processor to:
  receive signaling indicating a first coding scheme and a second coding scheme for coding a data packet, the signaling transmitted in a control channel transmission;
  receive a transmission of the data packet, the transmission using the first coding scheme for a first portion of the data packet, and using the second coding scheme for a second portion of the data packet, wherein the first portion of the data packet is associated with a first processing requirement for acknowledging the first portion of the data packet, and wherein the second portion of the data packet is associated with a second processing requirement for acknowledging the second portion of the data packet, the second processing requirement being different than the first processing requirement;
  process the first portion of the data packet and the second portion of the data packet based on the received signaling to generate an acknowledgment message, wherein the first coding scheme uses a first transport block size for the first portion of the data packet, and the second coding scheme uses a second transport block size for the second portion of the data packet that is different than the first transport block size; and
  transmit the acknowledgment message, wherein the acknowledgment message comprises at least one acknowledgment associated with the first portion of the data packet and at least one acknowledgment associated with the second portion of the data packet.

\* \* \* \* \*